US008688590B2

(12) United States Patent
Grim, III et al.

(10) Patent No.: US 8,688,590 B2
(45) Date of Patent: Apr. 1, 2014

(54) SYSTEM AND METHOD TO STRENGTHEN ADVERTISER AND CONSUMER AFFINITY

(75) Inventors: Clifton Grim, III, Seabrook, TX (US); Christopher I. Schmidt, Friendswood, TX (US); John D. Wilson, Houston, TX (US)

(73) Assignee: Google Inc., Mountain View, CA (US)

( * ) Notice: Subject to any disclaimer, the term of this patent is extended or adjusted under 35 U.S.C. 154(b) by 2064 days.

(21) Appl. No.: 11/082,489

(22) Filed: Mar. 17, 2005

(65) Prior Publication Data

US 2006/0085254 A1 Apr. 20, 2006

Related U.S. Application Data

(63) Continuation-in-part of application No. 10/965,592, filed on Oct. 14, 2004.

(51) Int. Cl.
G06Q 20/00 (2012.01)
G06Q 30/00 (2012.01)

(52) U.S. Cl.
USPC .......................................... 705/74; 705/14.73

(58) Field of Classification Search
USPC ................. 705/14, 14.73, 74; 455/456, 414.1
See application file for complete search history.

(56) References Cited

U.S. PATENT DOCUMENTS

| 5,426,281 | A | | 6/1995 | Abecassis |
|---|---|---|---|---|
| 5,892,900 | A | * | 4/1999 | Ginter et al. .................. 726/26 |
| 5,910,988 | A | | 6/1999 | Ballard |
| 6,105,131 | A | * | 8/2000 | Carroll ......................... 713/155 |
| 6,141,423 | A | | 10/2000 | Fischer |
| 6,182,050 | B1 | * | 1/2001 | Ballard ........................... 705/14 |
| 6,216,229 | B1 | | 4/2001 | Fischer |
| 6,247,127 | B1 | | 6/2001 | Vandergeest |
| 6,298,348 | B1 | * | 10/2001 | Eldering ..................... 705/36 R |
| 6,324,650 | B1 | | 11/2001 | Ogilvie |
| 6,334,109 | B1 | * | 12/2001 | Kanevsky et al. .............. 705/14 |
| 6,438,690 | B1 | * | 8/2002 | Patel et al. .................... 713/156 |
| 6,631,397 | B1 | * | 10/2003 | Satomi et al. ................. 709/203 |
| 6,954,753 | B1 | | 10/2005 | Jeran |
| 6,993,326 | B2 | * | 1/2006 | Link et al. .................. 455/414.1 |
| 7,013,388 | B2 | | 3/2006 | Fisk et al. |
| 2002/0107027 | A1 | * | 8/2002 | O'Neil .......................... 455/456 |

(Continued)

FOREIGN PATENT DOCUMENTS

WO 02/29516 4/2002

OTHER PUBLICATIONS

Applicant submitted NPL dated May 21, 2009.*

(Continued)

Primary Examiner — Sun Li
(74) Attorney, Agent, or Firm — Young Basile Hanlon & MacFarlane P.C.

(57) ABSTRACT

A system and method is provided for an on-demand advertising information vault so that advertisers may establish accounts for distributing advertisements on-line to potential subscribers. The on-demand information vault also provides for consumers to subscribe to advertisements from advertisers based on the consumer's preferences of categories of products or services. An advertiser may also establish rewards for viewing their advertisements for inducing consumers to subscribe to their advertising service. In this way, a consumer may agree to receive only certain types of advertisements and receive remuneration for viewing the advertisements. The vault mechanisms may also provide for protecting the identities of the consumer and advertiser and avoids misusing personal data by others by employing security measures.

27 Claims, 26 Drawing Sheets

(56) References Cited

U.S. PATENT DOCUMENTS

| | | | |
|---|---|---|---|
| 2002/0107803 A1 | 8/2002 | Lisanke et al. | |
| 2002/0112153 A1 | 8/2002 | Wu et al. | |
| 2002/0112162 A1 | 8/2002 | Cocotis et al. | |
| 2003/0033199 A1* | 2/2003 | Coleman | 705/14 |
| 2003/0079133 A1 | 4/2003 | Breiter et al. | |
| 2003/0191716 A1 | 10/2003 | Woods et al. | |
| 2003/0204447 A1 | 10/2003 | Dalzell et al. | |
| 2003/0225693 A1 | 12/2003 | Ballard et al. | |
| 2004/0221920 A1* | 11/2004 | Ferguson et al. | 141/392 |
| 2006/0085344 A1 | 4/2006 | Grim, III et al. | |

OTHER PUBLICATIONS

F. Bastani et al., "A High-Assurance Measurement Repository System", Proceedings Fifth IEEE International Symposium on High Assurance Systems Engineering (HASE 2000), pp. 265-272.

K. Seo et al., "Public—Key Infrastructure for the Secure Border Gateway Protocol (S-BGP)", IEEE, 2001, pp. 239-253.

S. Capkun et al., "Mobility Helps Security in AD Hoc Networks", MobiHoc 2003, pp. 46-56.

L. Zhou et al., "COCA: A Secure Distributed Online Certification Authority", ACM Transactions on Computer Systems, vol. 20, No. 4, Nov. 2002, pp. 329-368.

Office Action for corresponding U.S. Appl. No. 11/227,539.

Notice of Allowance for corresponding U.S. Appl. No. 10/965,592.

F. Bastrini et al., "A High-Assurance Measurement Repository System", Proceedings, Fifth IEEE International Symposium on high Assurance Systems Engineering (HASE 2000), pp. 265-272.

S. Ye et al., "SCENS: a System for the Mediated Sharing of Sensitive Data", Proceedings of the 2003 Joint Conference on Digital Libraries.

Karen Seo et al., "Public-Key Infrastructure for the Secure Border Gateway Protocol (S-BGP)", IEEE, 2001, pp. 239-253.

Srdjan Capkun et al., "Mobility Helps Security in Ad Hoc Networks", MobiHoc 2003, pp. 46-56.

Lidong Zhou et al., "COCA: A Secure Distributed Online Certification Authority", ACM Transactions on Computer Systems, vol. 20, No. 4, Nov. 2002, pp. 329-368.

\* cited by examiner

SYSTEM AND METHOD TO STRENGTHEN ADVERTISER AND CONSUMER AFFINITY

CROSS REFERENCE TO RELATED APPLICATIONS

This application is a continuation-in-part of U.S. patent application Ser. No. 10/965,592 filed on Oct. 14, 2004, which is incorporated by reference herein.

DESCRIPTION

BACKGROUND OF THE INVENTION

1. Field of the Invention

The invention generally relates to a system and method for an information vault and, more particularly, to a system and method for an information vault that provides management of mutually agreed upon access to information between advertisers and consumers.

2. Background Description

In today's world, there is a very weak connection between consumers and advertisers. Advertisers generally use a "shotgun" approach in their attempts to reach consumers and these customers are typically unqualified as potential buyers of the advertiser's goods and services. On the other hand, the customers on the receiving end are typically inundated with spam on email, a mailbox full of junk mail, or telemarketing calls at dinner time. Consumers have to sift through this "noise" to find an offer that may be beneficial to them; however, most people do not bother to consider these advertisements/solicitations.

Exemplary problems facing advertisers include, but are not limited to:
 Difficulty finding interested consumers.
 Difficulty finding qualified consumers.
 Overcoming consumer hostility for the invasion of their privacy.
 Getting their message recognized out of the general background advertising "noise."

Similarly, exemplary problems facing consumers include, but are not limited to:
 Constant invasion of privacy by advertisers.
 Not being able to distinguish legitimate offers of interest from "junk" offers.
 Overhead of dealing with this "junk" advertising.

As a consequence, matching qualified consumers with advertisers has an intrinsic value. Advertisers are often willing to pay for highly qualified consumers. In fact, advertisers very often do pay for information associated with qualified consumers. For example, advertisers frequently pay market research firms, middlemen who create targeted phone lists, or when banners are displayed on a web page. Unfortunately, none of this compensation paid by an advertiser ever goes to the actual target of the advertiser, i.e., the consumer. The consumer does not benefit financially from receiving the "message." The consumer is rarely rewarded for letting the advertiser into their space. Other parties (e.g., middlemen, research firms, or the like) receive this benefit.

Ultimately, information is valuable. The illicit use of information could cause a financial loss to the owner or confer an unfair advantage to another party. For example, organizations collect personal information and preferences and sell them on the open market as phone lists, market research, or the like. The individual who owns this information (i.e., the person themselves) never gets directly or indirectly compensated. Instead, the information compilers or middlemen essentially take an individual's information and sell the information. Not only does the individual not get compensated for the middlemen's and advertisers' use of the information but are also indiscriminately solicited or spammed as a result.

Typically, the current common solution involves each "second party", i.e., the entities an individual may give personal information to, "to promise" via privacy policies that are long and difficult to read, to not compromise or sell information. It is common knowledge that these policies are then either ignored or having been slyly worded, the private personal information is shared with others. Or, the private information is merely stolen by outsiders or insiders at any of the thousands of entities that store personal information.

Examples of attempts to address information privacy issues include Microsoft® Corporation which has implemented a centralized, single sign on/authentication service called Passport® which may store your private information and provide it only to web sites that have agreed to certain privacy agreements. Microsoft® also has tried to implement Hailstorm®, a centralized storage system with charges for people to store their data. The Liberty Alliance project is another example effort to provide similar single sign on specifications that vendors may provide.

However, each of these implementations has not addressed allowing an owner of the information to control access to their data or their privacy and to enable value to flow to the owner of the personal information. Advertisers would be very much inclined to delivery information to consumers while honoring their privacy, if the advertisers were assured that their information would be viewed or consumed. One the other hand, consumers would likely be willing to provide their information if it were secured from dissemination or misuse and, in particular, if the consumer is rewarded for accepting or "consuming" the advertising.

SUMMARY OF THE INVENTION

In an aspect of the invention a secure information repository system is provided. The system comprises data storage for securely storing information, associated with an account holder and a deposit system for securely depositing information into the data storage. The system further comprises an information access system for accessing the information stored in the data storage and an advertising system that registers advertisements into the data storage and delivers the advertisements to subscribers of the advertising system.

In another aspect of the invention, a system for providing a protected information repository is provided. The system comprises an information vault having data storage comprising means for securely creating an advertiser account in the information vault and means for securely depositing advertising information in the information vault. The system further comprises means for accessing the advertising information provided by the information vault and means for charging or crediting fees for transactional activity involving the advertising information.

In another aspect of the invention, a method of providing an information repository is provided. The method comprises the steps of accessing an on-demand advertising vault to perform a transaction involving a item of advertising information stored in the on-demand advertising information vault, authenticating an identity of an entity performing the accessing, executing the transaction when the identity of the entity is authenticated and logging the transaction.

In another aspect of the invention, a method of charging for advertising is provided. The method comprises the steps of depositing advertising data by an owner into an advertising service of an information vault, establishing a subscription for at least one entity and enabling access to the advertising data by the at least one entity; accessing the advertising by the at least one entity according to terms of the advertising system and awarding a credit for accessing the advertising data.

In another aspect of the invention, a method of providing an advertising service is provided. The method comprises creating an on-demand information vault, soliciting advertisers to create advertising accounts in the on-demand information vault and providing advertising to subscribers of the on-demand information vault based on subscriber preferences, wherein the subscribers receive a reward for viewing the advertising.

In another aspect of the invention, a computer program product comprising a computer usable medium having readable program code embodied in the medium is provided. The computer program product includes at least one component to deposit advertising data by an owner into an advertising service of an information vault establish a subscription for at least one entity and enabling access to the advertising data by the at least one entity, access the advertising by the at least one entity according to terms of the advertising system and award a credit for accessing the advertising data.

DETAILED DESCRIPTION OF EMBODIMENTS OF THE INVENTION

This invention is generally directed to a system and method for providing an information vault so that individual owners of personal data may control and manage permissions for accessing and disseminating personal data and for controlling information flow, such as advertisements or solicitations. The system and method also provides for the owner of the personal data to receive compensation for the use of the personal data and/or for receiving and reading advertisements thus, in effect, the personal data for consumption of advertising becomes a valuable commodity analogous to money. The invention provides a business model that allows competitive, unbiased trusted third parties whose business is protecting the information analogous to how a commercial bank protects money.

To this end, the system and method of the invention provides a trusted storage of personal data or information, thereby minimizing the number of copies that may be in existence. Second party access to the trusted storage of personal data or information may be made on-demand, as required for commerce, with a process for assessing fees for accesses.

Figure 1:
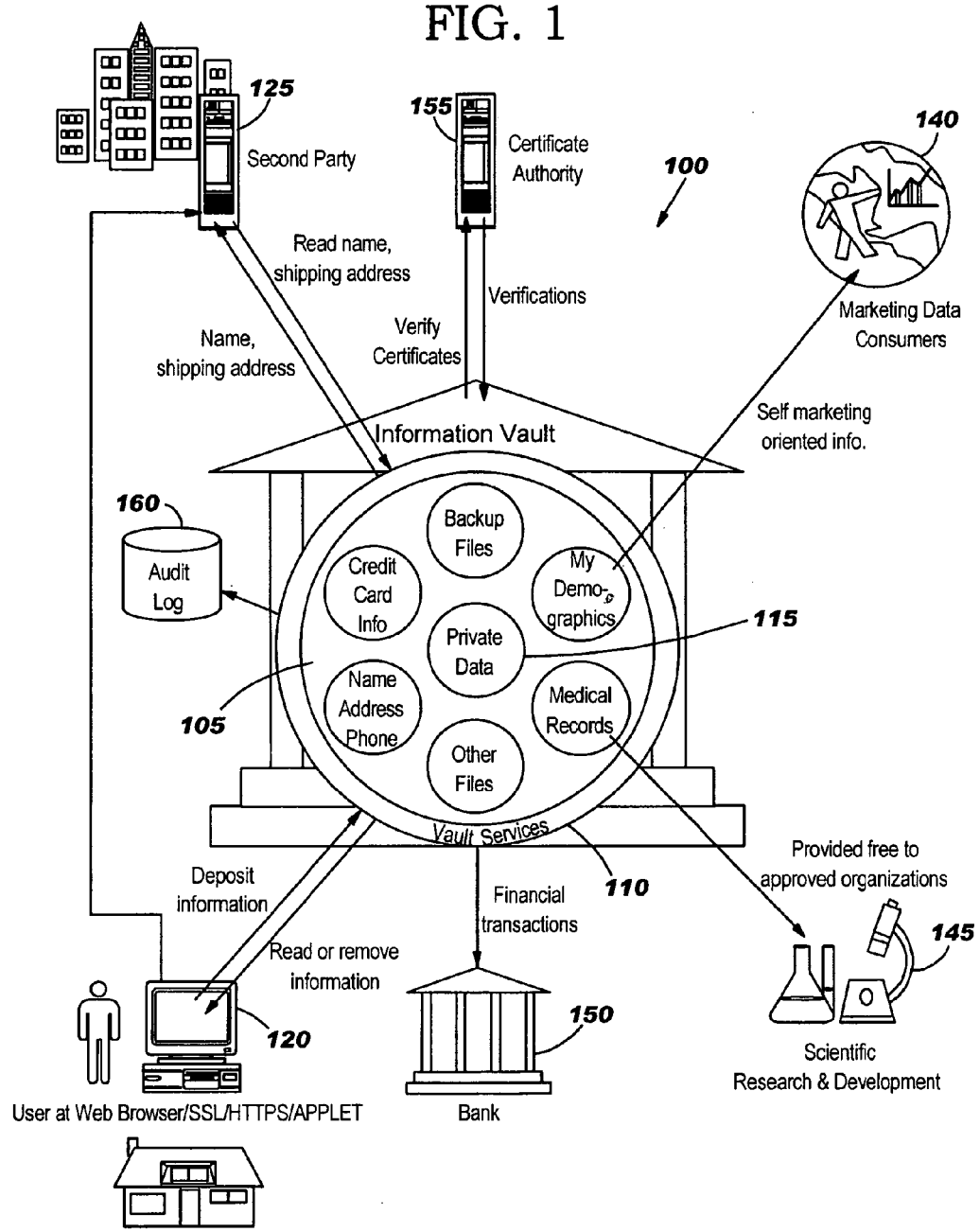
FIG. 1 is an exemplary overview of an embodiment of the invention.

FIG. 1 is an exemplary overview of an embodiment of the invention. An "Information Vault", generally denoted by reference numeral 100, provides for an information infrastructure patterned somewhat after the currency model of the world's financial infrastructure, for example. The vault 100 employs current data storage 105 and security technologies to provide a secure storage mechanism for user's information, such as for example, name, address, phone numbers, medical records, credit card information, demographic information, advertising information, or virtually any type of data. Certain information may be encrypted by the owner to make the data totally private, even from the vault, as denoted by reference numeral 115. A computer system 120 (e.g., a personal computer) may be employed by a user to read or remove information from the vault or to deposit information to the vault.

A set of services 110 are provided, built on the vault's secure storage, to allow users to create accounts, deposit information in any form, and read or remove the information. Information may be stored in the vault encrypted by the vault and optionally, users may encrypt the information with their own private key.

In addition, vault services 110 are provided to allow a user to specify conditions, in a secure way via technologies of the existing Public Key Infrastructure (PKI), so that a second party 125 may have read access to certain, sharable portions of the user's information. All accesses typically use the first and second party's public keys as identification. To share information with a second party, a contract data token specifying the two parties' public keys may be created and digitally signed by the first party's private key to ensure that access to private information is not propagated beyond the second party. This feature of the invention allows a migration away from the current approach of users providing second party entities (e.g. online web merchants) their personal information and thereafter compelled to trust the merchants to securely protect the information from compromise.

With this invention's approach, the user provides the second party 125 permission to read an agreed upon (perhaps by contract) set of personal information. As the information is thereafter always available to the second party (at least until cancellation or recasting of the contract), there is no longer any need for the second party to store the user's information within its own databases. As a trusted third party for information, then, the information vault 100 significantly contributes to the elimination of the escalating dangers of identity theft.

The system may also allow second parties to request certain processing or services which may significantly eliminate the need for the second party 125 to ever see the personal information of the first party, as necessary. Provision is also made in the system for a user to specify personal information (e.g., my consumer preferences and demographics) that the vault may make publicly available for commercial purposes such as marketing data consumers 140, with proceeds going to the user/owner, or otherwise, made publicly available for free for charitable or scientific purposes 145.

FIG. 1 shows that the invention is based on, and does not replace, the financial network for payments (e.g., banking 150) for information vault services or Certificate Authorities 155 of the PKI for certificate and key verifications. The interface to the bank 150 may include interfaces to financial networks for debits and payments for vault transactions and services. The invention may also provide audit logs 160 of transactions.

The invention, therefore, establishes the concept of information as "money" or "currency" itself. This implies that an information repository may be built that is modeled on a financial bank. Information may be deposited, withdrawn, shared, processed upon and protected in a safety deposit box. Additionally, the information, itself, may be used to generate income.

To this end, as described above and in more detail below, the invention is capable of providing underlying technology and business processes for providing an information vault, exchange and processing system that include in embodiments:
- a technique that allows information to be deposited in the vault;
- a controlled access method to remove this information from the vault;
- an intermediary service so that information may be effectively escrowed and then delivered to the appropriate party as needed as opposed to requiring the second party to store the information locally;
- a method to track consumers of certain information sets;
- an infrastructure that allows certain classes of information to generate income for the owner;
- a dual key safety deposit box for information such that only a specified party will be able to gain access;
- the ability to allow the repository to perform certain functions on the data of one or more parties;
- ability for soliciting advertisers to create subscription advertising accounts;
- the technique and method to financially charge for the above services.

Figure 2:
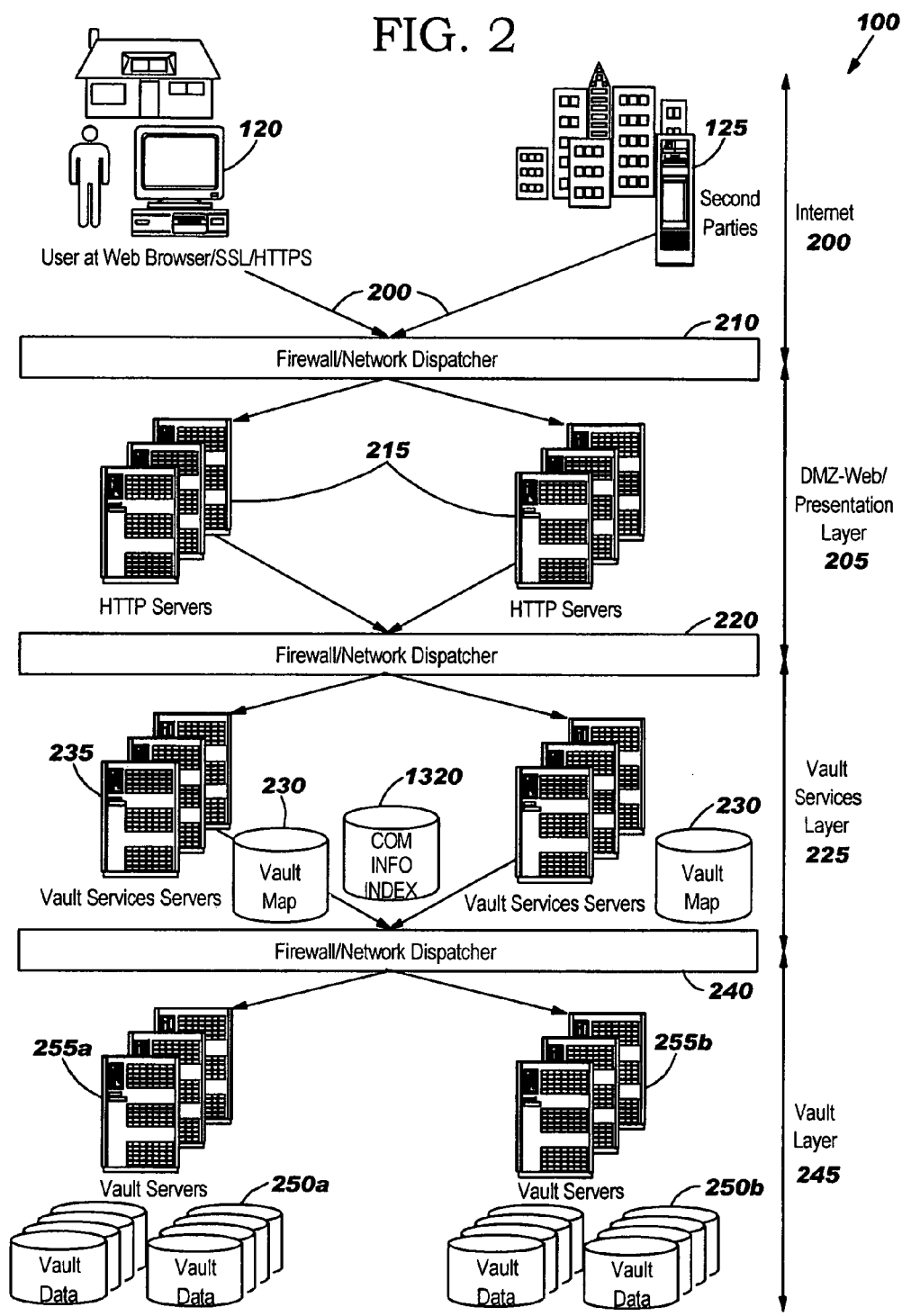
FIG. 2 is a block diagram of an embodiment of an information vault architecture.

FIG. 2 is a block diagram of an embodiment of a physical information vault architecture. The Information Vault 100 comprises a typical three tier networking architecture. A user, via user computer 120, and second party or parties 125 may access the Information Vault 100 with a secure connection over the Internet 200 or similar connection The first tier layer 205 facing the open network is the DMZ (i.e., popularly referred to as the "demilitarized zone") or presentation tier. This layer sits behind a firewall/network dispatcher 210 and includes multiple HTTP Servers 215, possibly geographically separated for high availability reasons. This first tier layer 205 accepts requests from outside users and provides presentation level services for the requests. Service requests are passed on to the application services layer of the vault services.

Another firewall/network dispatcher 220 may be placed between the DMZ 205 and the vault services layer 225. The vault services layer 225 handles the business logic for the system, as described below. One or more databases 230 within the layer keep metadata and a mapping between uses and their associated information. When a service server 235 needs to retrieve information, a request is made through a third firewall/network dispatcher 240 to the Vault Layer 245. The Vault Layer 245 may be a highly redundant set of storage areas 250a and 250b, typically geographically separated. In addition, data may be sliced across the separated servers 255a and 255b so that no single compromise of security may provide access to user information. Other data security technologies may be applied to the information vault 100 in order to ensure integrity, as would be known to one of ordinary skill in the art.

Figure 3:
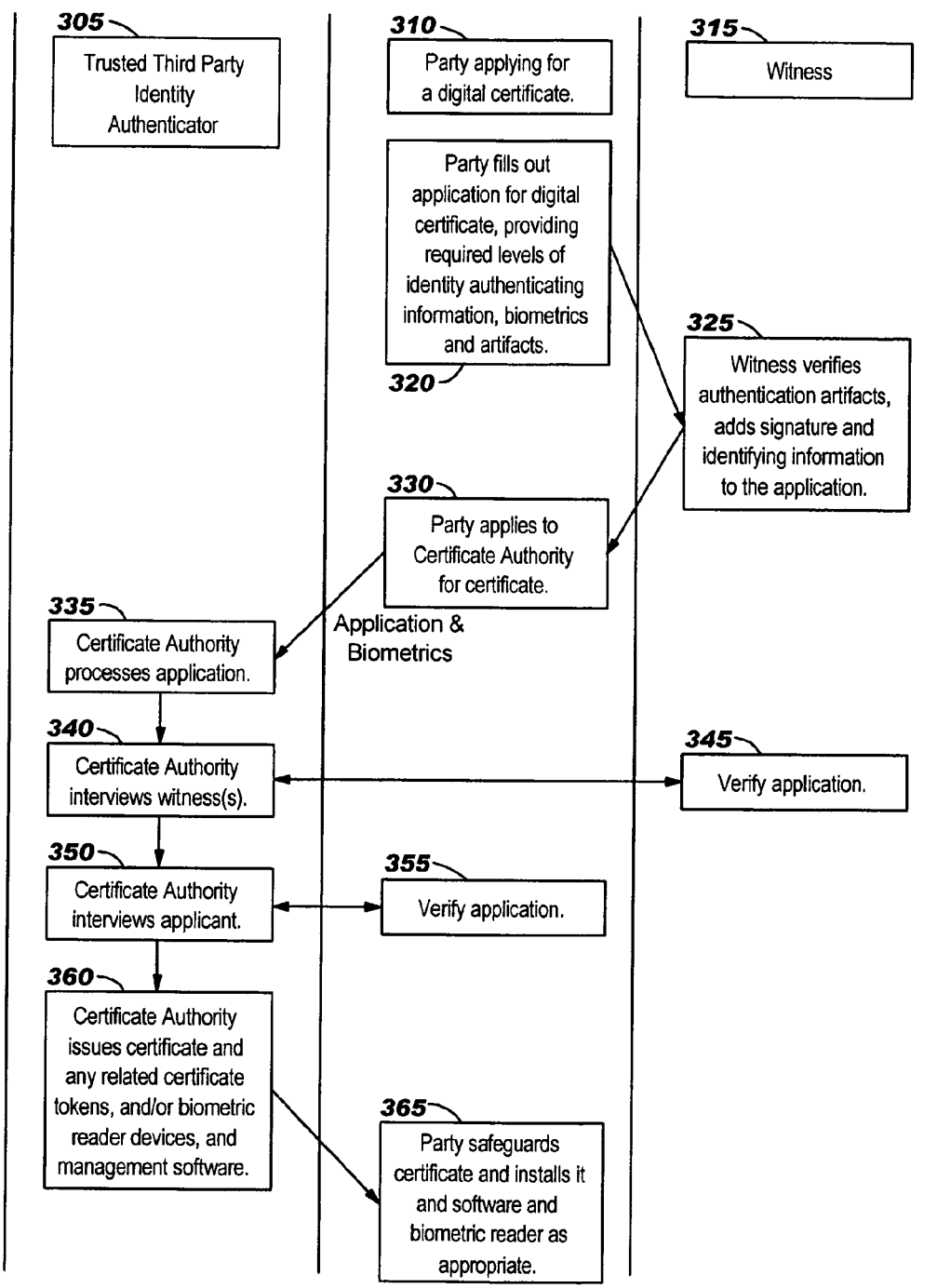
FIG. 3 is a swim lane diagram showing steps of an embodiment of a digital certificate creation.

FIG. 3 is a swim lane diagram showing steps of an embodiment of a digital certificate creation. "Swim lane" diagrams may be used to show the relationship between the various "actors" in the processes and to define the steps involved in the processes. FIG. 3 (and all the other swim lane diagrams) may equally represent a high-level block diagram of components of the invention implementing the steps thereof. The steps of FIG. 3 (and all the other diagrams employing swim lane diagrams or otherwise showing steps) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. The steps of FIG. 3 (and the other swim lane Figures) may also be implemented by the embodiments of FIGS. 1 and 2.

Referring to FIG. 3, three swim lanes are shown including a lane for Trusted Third Party Identity Authenticator 305 (e.g., certificate authority 155), a lane for the party applying (applicant) for a digital certificate 310, and a lane for a witness 315. At step 320, the applicant completes an application for a digital certificate providing any number of identity authenticating information predetermined by the vault provider, such as biometrics, personal information (e.g., name, address, age, financial data, date of birth, or the like) and artifacts.

At step 325, a witness(es) verifies the authentication artifacts and adds a signature and witness identification to the application. At step 330, the applicant applies to a certificate authority (e.g., certificate authority 155) for a certificate. At step 335, the certificate authority processes the application and checks for completeness. At step 340, the certificate authority interviews the witness(es) and at step 345 the witness(es) verify the application.

At step 350, the certificate authority interviews the applicant and at step 310, the applicant verifies the application. At step 360, the certificate authority issues a certificate and related certificate tokens and/or biometric reader devices, and management software. At step 365, the applicant safeguards the certificate and installs the certificate, management software, and biometric reader, as appropriate.

Figure 4:
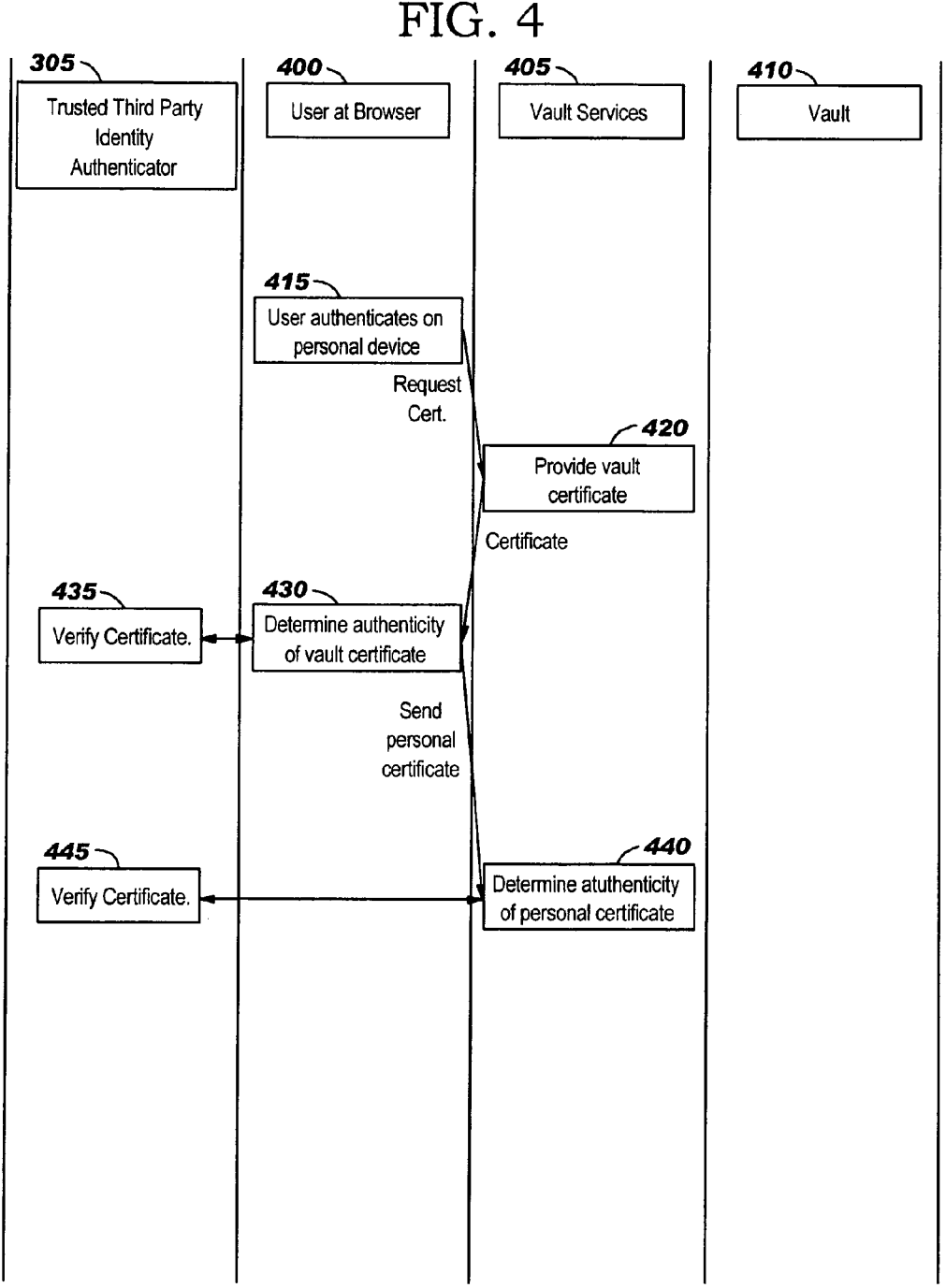
FIG. 4 is a swim lane diagram of an embodiment showing steps of mutual party authentication.

FIG. 4 is a swim lane diagram of an embodiment showing steps of mutual party authentication, beginning at step 415. Four lanes are shown including a lane for the trusted third party identity authenticator 305, a lane for a user (typically at a browser) 400, a lane for vault services 405, and a lane for the vault 410. At step 415, the user may authenticate themselves on a personal device such as a biometric device and requests a certificate from the vault services via a browser or other technique.

At step 420, the vault service provides a certificate to the user. The certificate has identifying information of the information vault plus a signed hash from a trusted certificate authority (CA). A signature may be created by calculating a hash over the data using an algorithm that is one-way (i.e., the identifying information cannot be generated from the hash value). The signing entity encrypts the hash value with its private key. The encrypted data may be unencrypted using the public key.

At step 430, the user's PC receives the certificate and, at step 435, using a third party identity authenticator determines the authenticity of the certificate by calculating a hash over the information vault's certificate, decrypts the signed hash value from the CA and compares the resulting two values to verify the certificate. Equal values indicate that the information vault is actually the information vault. Thus, the information vault is authenticated from the user's perspective.

At step 440, the vault services receives the user's personal certificate and, at step 445, the authenticity of the user's personal certificate is determined in a like manner as the vault certificate and is authenticated by verifying the personal certificate. Thus, the personal certificate is authenticated by the third party authenticator and returned to the vault services. After this, the user's machine encrypts all traffic to the information vault using the information vault's public key, and the information vault encrypts data to the user with the user's public key. A secure transport such as secured socket layer (SSL) communication may be employed by the vault services.

Figure 5:
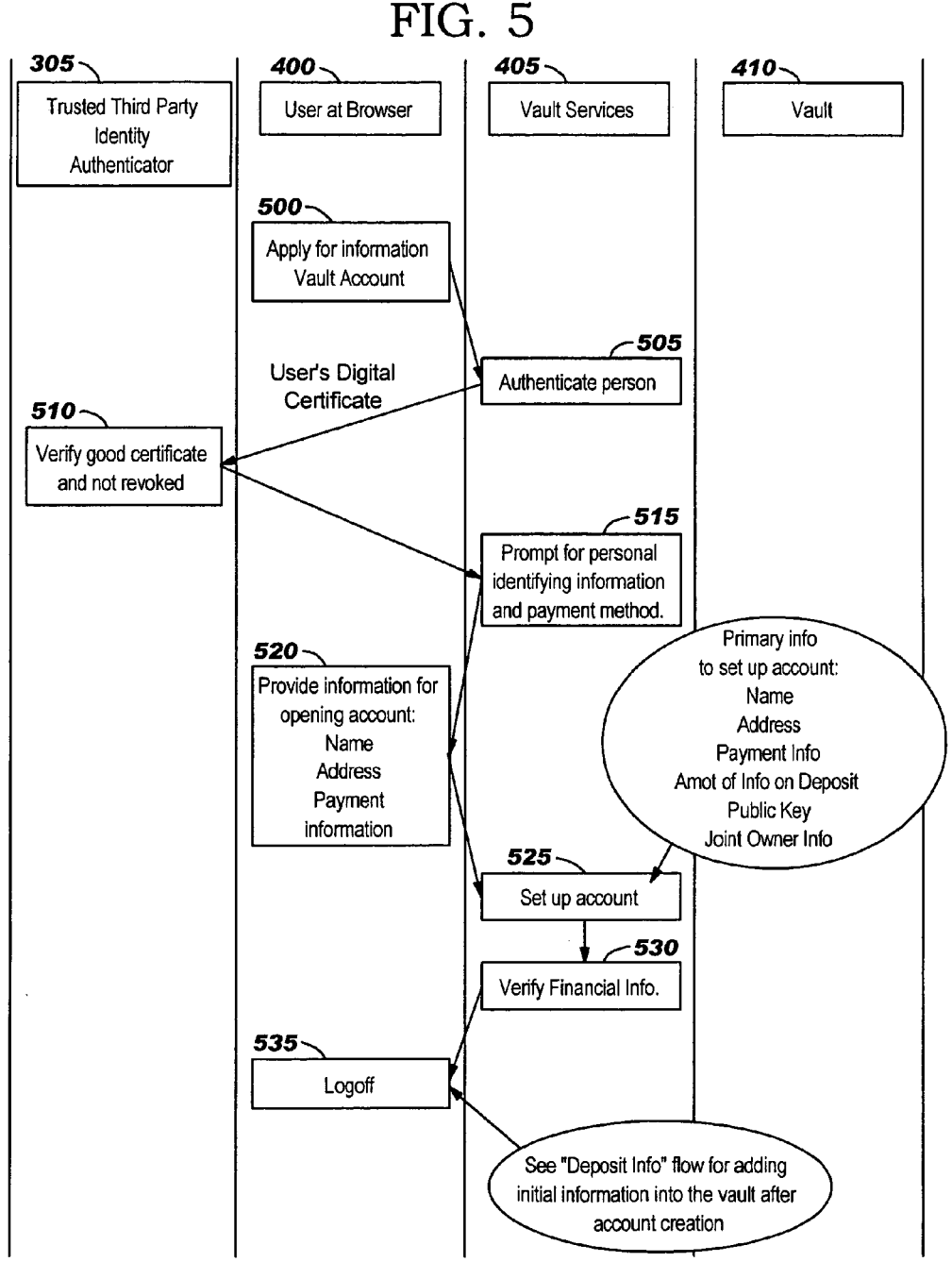
FIG. 5 is a swim lane diagram of an embodiment showing steps of creating an account.

FIG. 5 is a swim lane diagram of an embodiment showing steps of creating an account. At step 500, the user chooses to apply for an information vault account and access the information vault services supplying a personal digital certificate. At step, 505, the vault services determine the authenticity of the applicant/user, and, at step 510, using the third party authenticator, verifies the applicant's certificate. At step 515, the vault services prompt the user for personal and payment information. At step 520, the user/applicant provides information for opening an account such as name, address, date of birth, social security number, payment information, joint account information, or the like. At step 525, the vault services gather any demographic data and certificate public key to establish the applicant's account. Optionally, at step 530, the applicant's financial data is verified. At step 535, the account is established and the user/applicant may log off.

Figure 6:
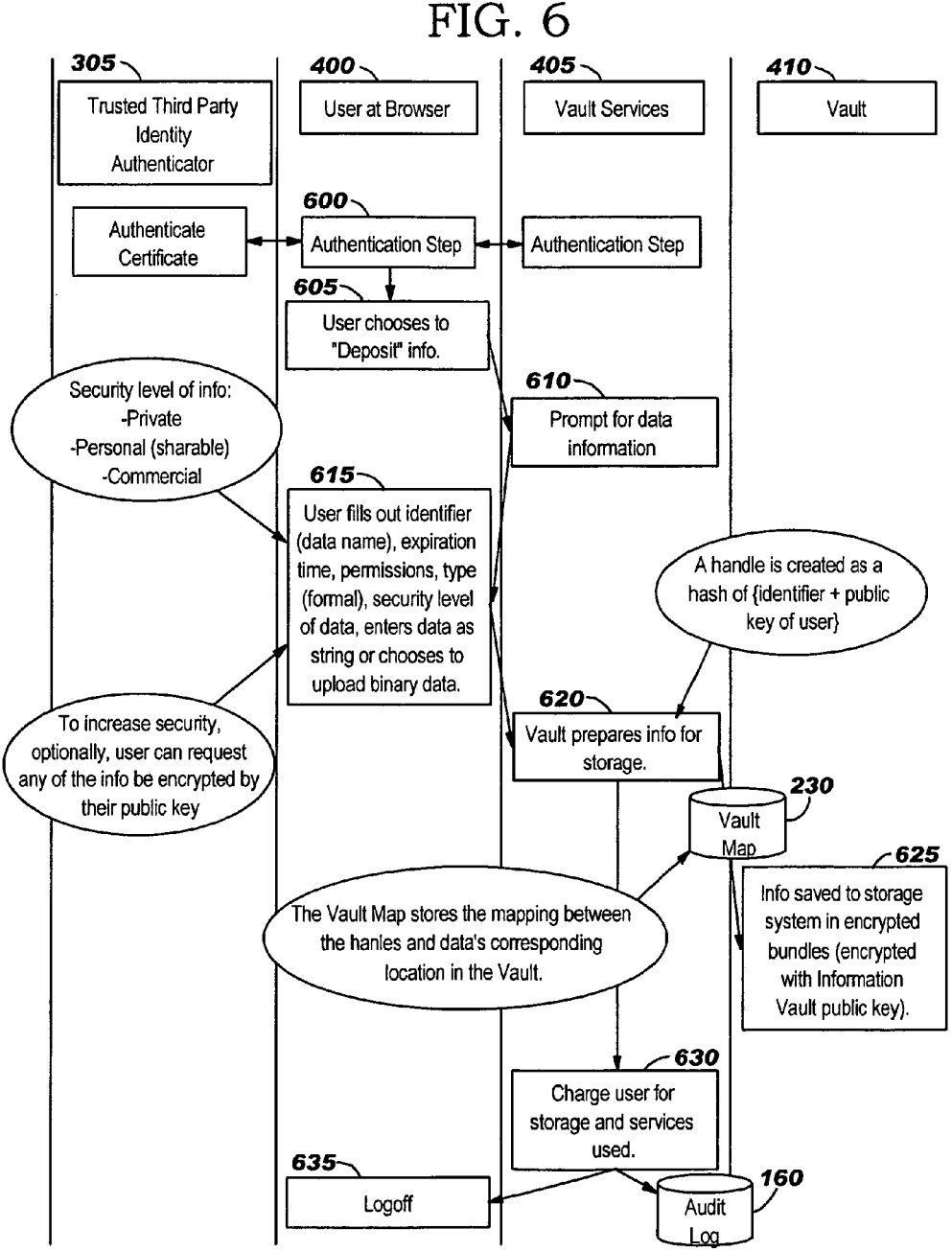
FIG. 6 is a swim lane diagram of an embodiment showing steps of depositing information into a user account.

FIG. 6 is a swim lane diagram of an embodiment showing steps of depositing information into a user account, beginning at step 600 where the user and vault services mutually authenticate one another (e.g., the process of FIG. 4). At step 605, the user may choose to deposit an item of information at the information vault. At step 610, a prompt is issued by the vault services for identifying the information (user created or pre-generated) such as permissions, expiration time, the security level (e.g., open, secure, anonymous/lock box). The user's device encrypts the information with public key of the information vault which ensures that only the vault may read the information. The information may be transmitted to the information vault.

At step 615, the user enters data or chooses to upload binary data. E.g., the user may add a string of data or a binary file (binary can be any information, including, for example, a text file or video). The string data may include descriptive information about the information item and may describe the format of the information item itself. For private information, this field may optionally be used by the depositor to specify data format. For sharable information, the field may be set by the depositor and may be used to specify a pre-negotiated format identifier or set to a standard XML format. For commercial information, the depositor may select the type of commercial information to deposit, the associated Commercial Data Formatter (CDF) applet may be instantiated and the CDF sets the data type field accordingly. This string field is part of the descriptive information about the information item. It defines the access possibilities of the information item. At a minimum it can be set to: "Private", "Sharable", and "Commercial". The settings may have the following definitions in embodiments:

(i) Private: Only the information owner or joint owner may retrieve or remove the information item.
(ii) Sharable: The owner or joint owner may access the information item directly or a third party may access the item providing the third party has possession of an information contract for that item.
(iii) Commercial: The owner or joint owner may access the information item directly or a third party may access the item providing the third party is typically willing to pay a fee for the item.

At step 620, the vault services may use a one way hash algorithm to determine a hash location for the information. That is, the information may be stored on servers using a hash mechanism to create a unique identifier (handle) of the information (public key+information identifier), which may be used as the storage point for the information and remembered in the vault map 230. The information may be stored encrypted when creating a user account and may be encrypted with the information vault's public key. For open or secure security levels, the information may have metadata identifying the owner, permissions, etc. This allows the information vault to retrieve the information more easily at a later time. At step 625, the information may be saved to a storage system in encrypted bundles. A vault map may store the mapping between the handles and the data's corresponding location in the vault. At step 630, a charge may be applied to the user for the storage and use of the vault services. An audit log may be kept of the transaction. At step 635, the user may log off.

Figure 7:
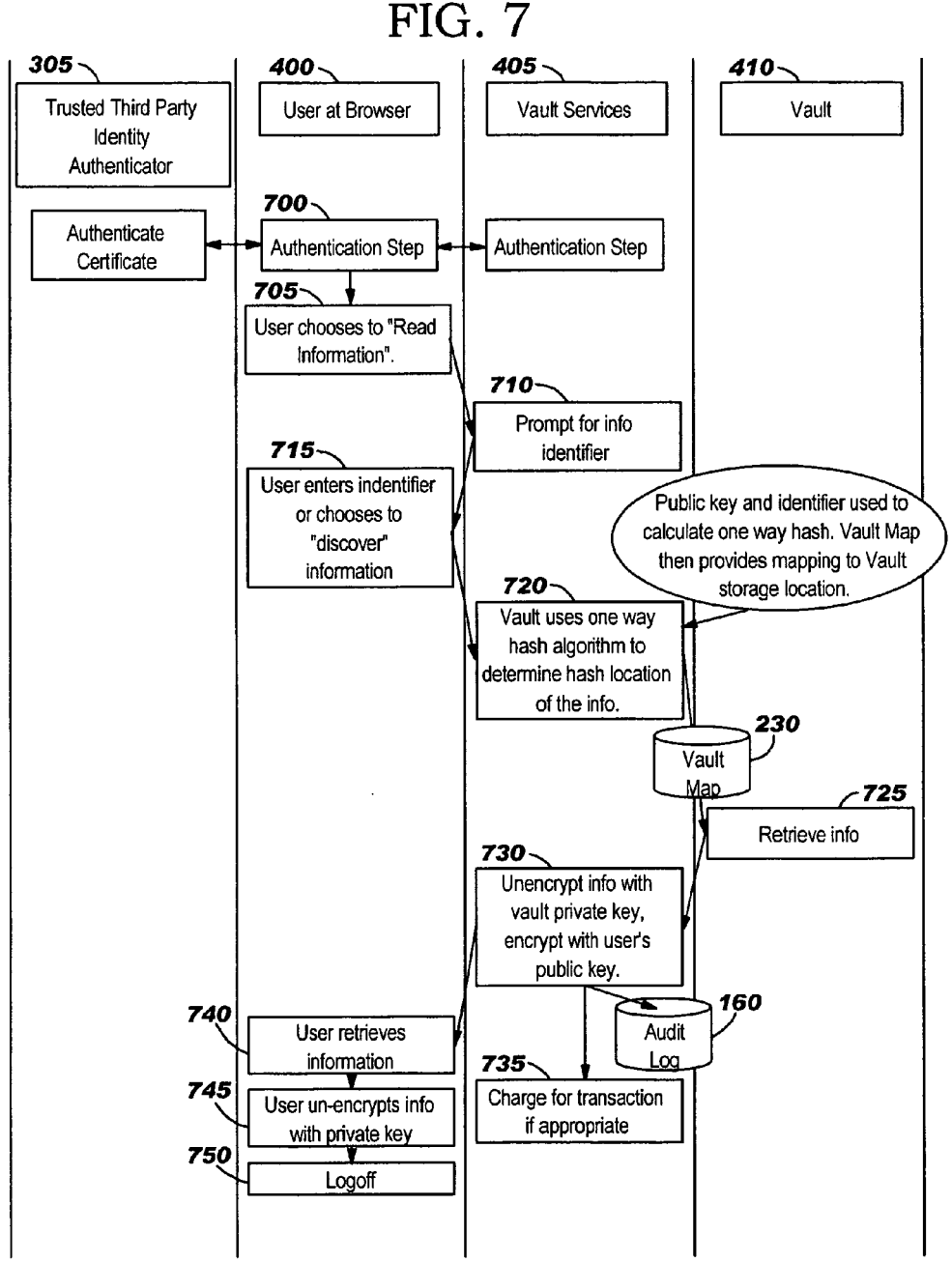
FIG. 7 is a swim lane diagram of an embodiment showing steps of reading information from an account.

FIG. 7 is a swim lane diagram of an embodiment showing steps of reading information from an account, beginning at step 700 where the user and vault services mutually authenticate one another (e.g., process of FIG. 4). At step 705 a user chooses to get/read information from the vault and accesses the vault services using a browser, for example. At step 710, a prompt is issued by the vault services for an information identifier. At step 715, the user may enter an identifier, choose a preset identifier, or choose to "discover" any open or secure items in the information vault associated with the identifier. One way that the discovery process may work is for the system to determine all combinations of the user's public key and identifiers. Any resulting has locations that have an open or secure item would be returned. At step 720, the vault service may use a one way hash algorithm to determine the location of the information employing the user's public key. At step 725, using the vault map, the information is retrieved by the information vault services from the vault.

At step 730, the information is decrypted with the vault's private key and encrypted with the user's public key. At step 735, a charge may be assessed for the transaction, if appropriate. An audit log entry may also be created. At step 740, the user retrieves the information. At step 745, the user decrypts the information with a private key and at step 750, the user may log off.

Figure 8:
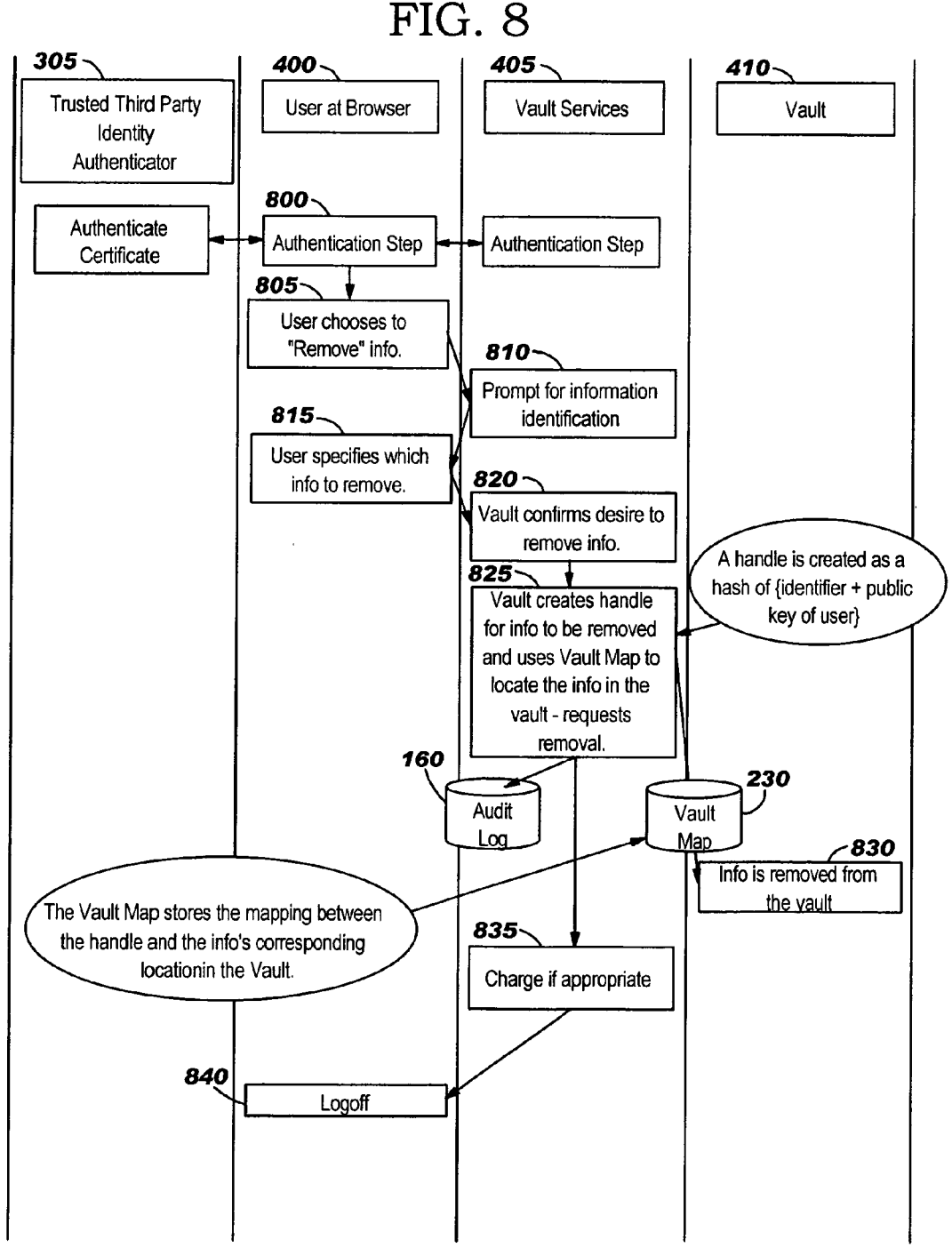
FIG. 8 is a swim lane diagram of an embodiment showing steps of removing information from a user account.

FIG. 8 is a swim lane diagram of an embodiment showing steps of removing information from a user account, beginning at step 800 where the user and vault services mutually authenticate one another (e.g., process of FIG. 4). At step 805, the user may choose to "remove" information from the vault by accessing vault services. At step 810, the vault services prompt for identification information from the user. At step 815, the user specifies which information to remove which may be an identifier, or choose to "discover" any open/secure items in the information vault.

At step 820, the vault services confirm the request to remove information. At step 825, the vault services use the public key of the user and identifier to create a hash value to access the vault map to find the information and request removal of the information. At step 830, the information is deleted from the vault. An audit log may be entered recording the removal. At step 835, a charge is created as appropriate for the removal activity. At step 840, the user may log off.

Figure 9:
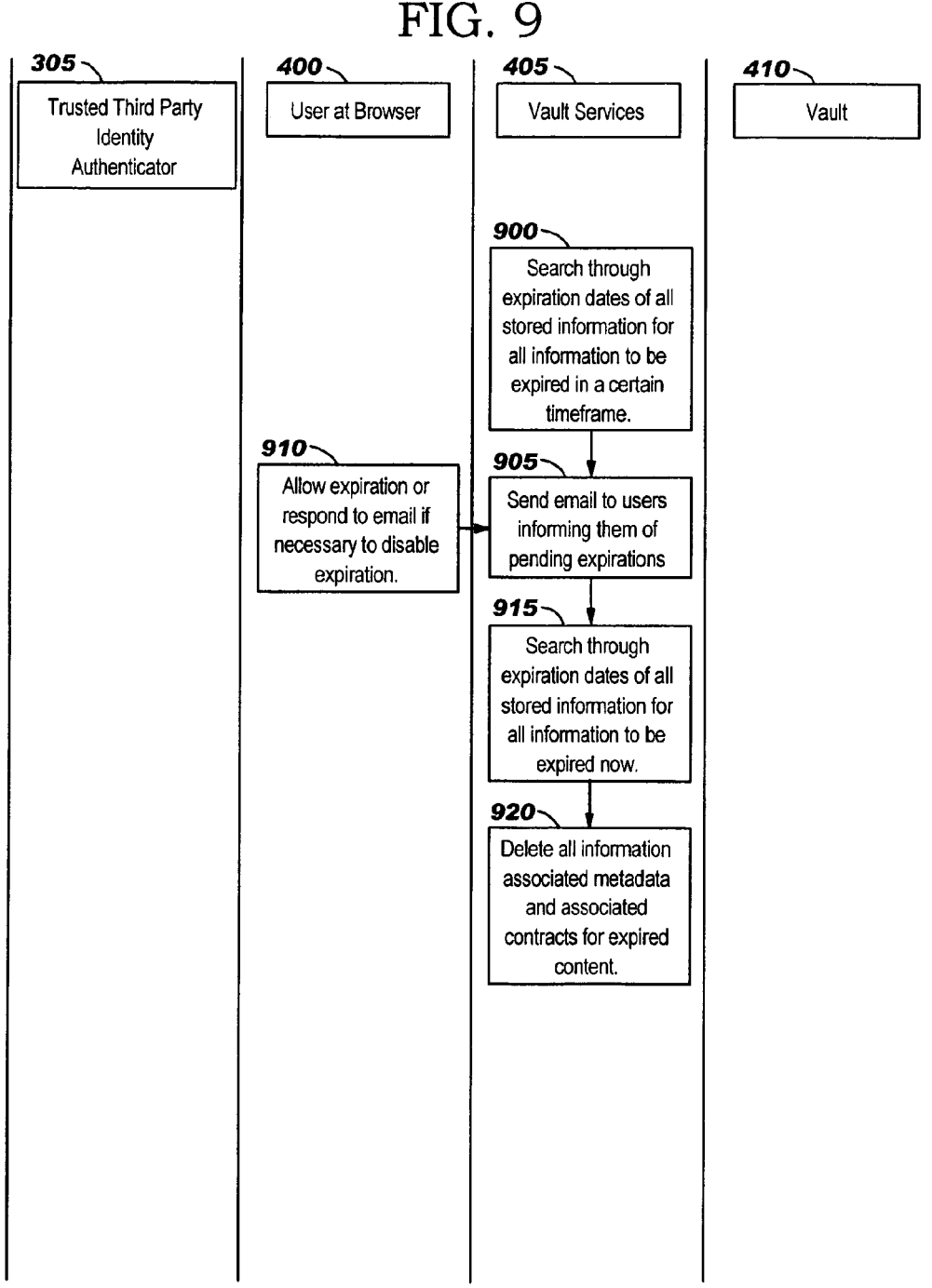
FIG. 9 is a swim lane diagram of an embodiment showing steps of expiring information from a user account.

FIG. 9 is a swim lane diagram of an embodiment showing steps of expiring information from a user account. At step 900, the vault services periodically (e.g., on a pre-determined schedule such as daily, monthly or other time basis) or continuously as a background activity, searches through the expiration dates of stored information for all information to be expired in a certain time frame. At a pre-determined time (e.g., a week, month, or similar time basis) prior to the actual expiration, users may be notified of any pending expirations. This notification may typically be an email notification or similar communication. At step 910, the user may respond to the notification in order to disable or reset the expiration, or may allow the expiration to occur by not responding. At step 915, the vault services locate all information that is scheduled to currently be expired at the pre-determined time. At step 920, at the pre-determined time, all information scheduled for expiration is deleted along with any associated metadata and contracts. The process may continue at step 900.

Figure 10:
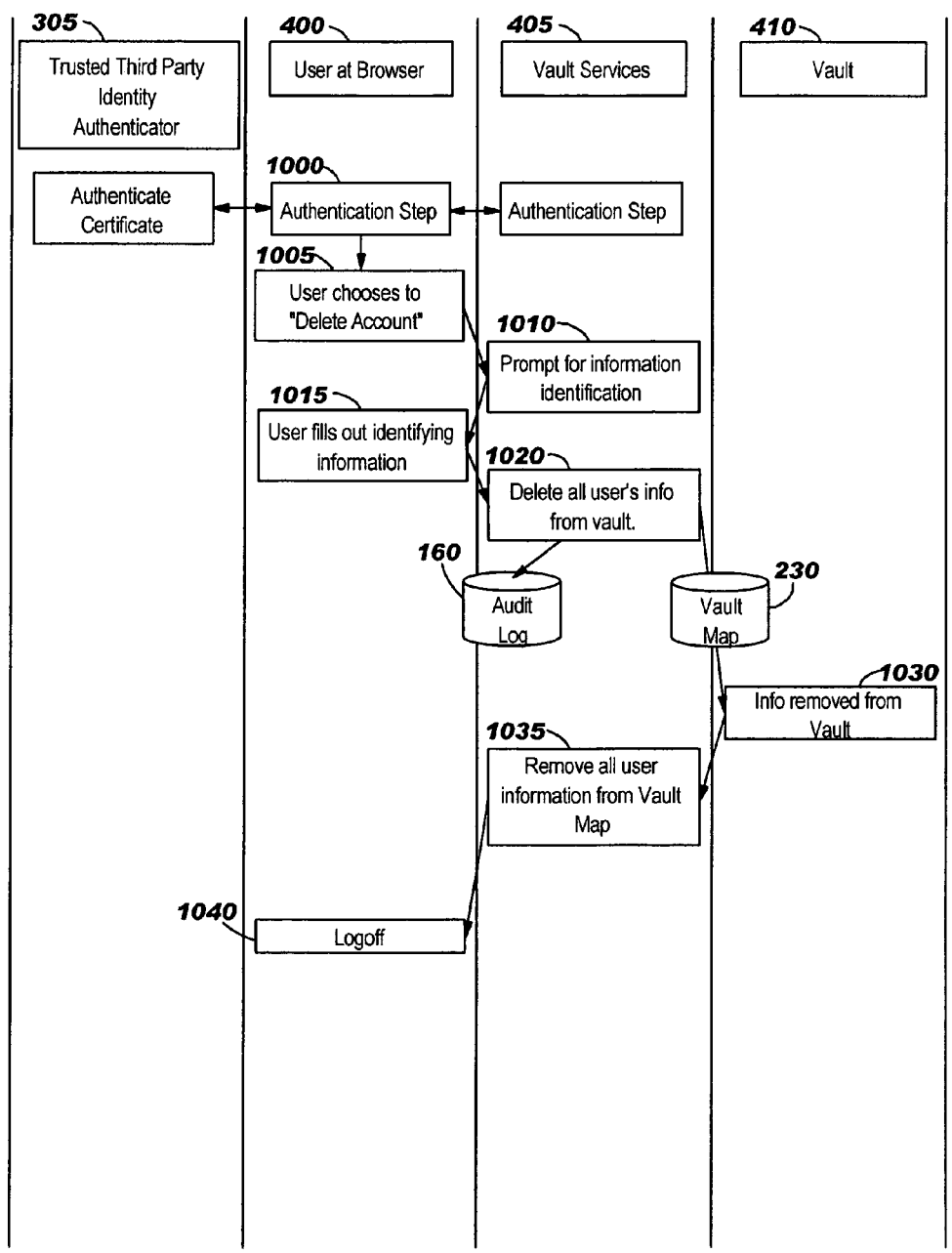
FIG. 10 is a swim lane diagram of an embodiment showing steps of deleting a user account.

FIG. 10 is a swim lane diagram of an embodiment showing steps of deleting a user account, beginning at step 1000 where the user 400 and vault services 405 mutually authenticate one another (e.g., process of FIG. 4). At step 1005, a user may choose an account to delete. At step 1010, the vault services prompt for identification information. At step 1015, the user enters identifying information of the account. At step 1020, the vault may re-affirm the account deletion and if the user affirms the deletion, a hash is computed to determine where the information resides using the vault map. An audit log may also be entered to record the activity. At step 1030, all stored information associated with the specified user account may be removed and all contracts with the user's information as associated with the account may be removed. Any demographic data and financial information may also be removed as associated with the account. At step 1035, all user information associated with the account may be deleted from the vault map. At step 1040, the user may log off.

Figure 11:
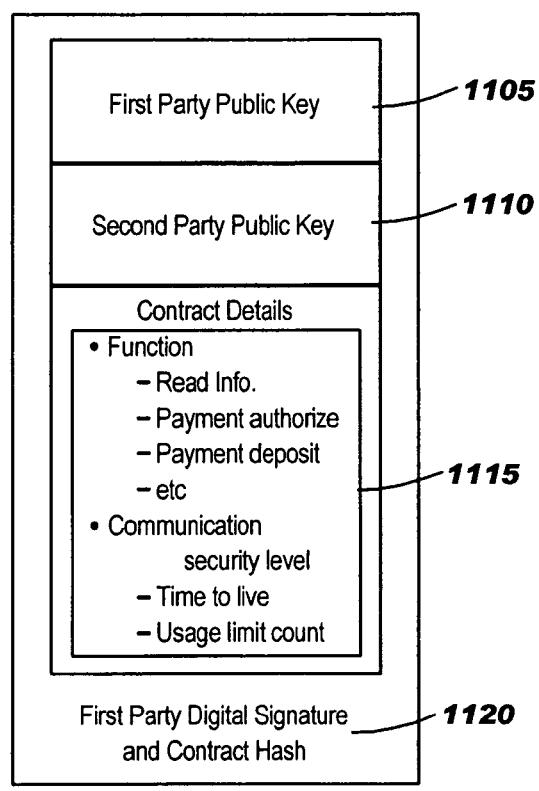
FIG. 11 is an illustrative diagram of an embodiment of a second party contract.

FIG. 11 is an illustrative diagram of an embodiment of a second party contract, generally denoted by reference numeral 1100. Second party access to user information may be controlled via the "contract" mechanism of this system. The contract 1100 is typically a data structure that may be created by the first party and given to the second party as a contract token that may be honored by the information vault 100. The contract 1100 may contain information identifying the two party entities and the functional exchange agreed by the contract. For example, the contract may define whether a phone number or an address may be given to a second party. Or, the contract may allow the vault to perform other services on behalf of the parties.

The information vault executes the required functional exchange after authenticating the integrity of the contract token and that the service requester is indeed the second party as called out in the contract. The contract defines the agreement between the first and second party. The information vault 100 typically executes this contract as the trusted third party. This contract 1100 may be held by the second party or deposited in the information vault 100. The contract 1100 is digitally hashed and signed by the first party's private key, generally denoted by reference numeral 1120. This allows the information vault 100 to ensure that the contract 1100 has not been altered since creation.

The contract 1100 also includes the first party public key 1105, the second party public key 1110, and contract details 1115. The contract details 1115 may include the agreed upon function(s) which may be read information, payment authorization, payment deposit, or similar information. The contract details 1115 may further include the communication security level, the time to live (e.g., an expiration date), and a usage limit count to control the number of times transactions may occur.

Figure 12:
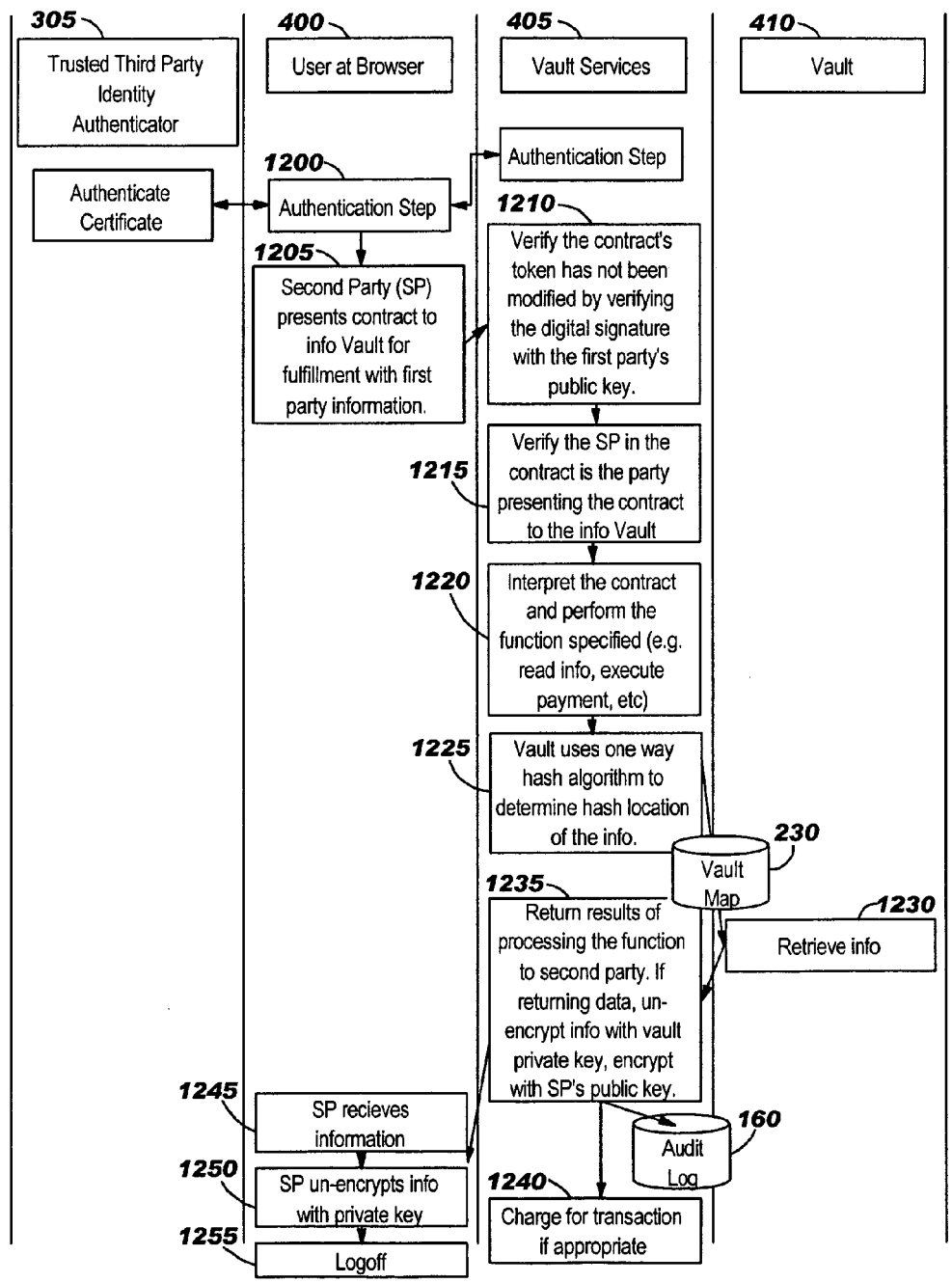
FIG. 12 is a swim lane diagram of an embodiment showing steps of a second party contract fulfillment.

FIG. 12 is a swim lane diagram of an embodiment showing steps of a second party contract fulfillment, beginning at step 1202, where the second party 1200 and vault services 405 mutually authenticate one another (e.g., via the process of FIG. 4). At step 1205, a second party presents a contract 1100 to the information vault 100 for fulfillment. At step 1210, the vault services verify that the contract's token has not been modified by verifying the digital signature with the first party's public key. At step 1215, the vault services verify that the second party in the contract is the party presenting the contract to the information vault. At step 1220, the contract may be interpreted and the functions specified in the contract details executed. At step 1225, the vault services use a one way hash and the vault map to locate the associated information in the vault.

At step 1230, the information is retrieved from the vault. At step 1235, any results of processing the functions of the contract are returned to the second party. Any data to be returned may be decrypted using the vault's private key and may be re-encrypted with the second party's public key. An entry into the audit log may also be made to record the access. At step 1240, any appropriate charge may be made for the transaction. At step 1245, the second party receives the information. At step 1250, the second party decrypts the information using the second party private key. At step 1255, the second party may log off.

Figure 13:
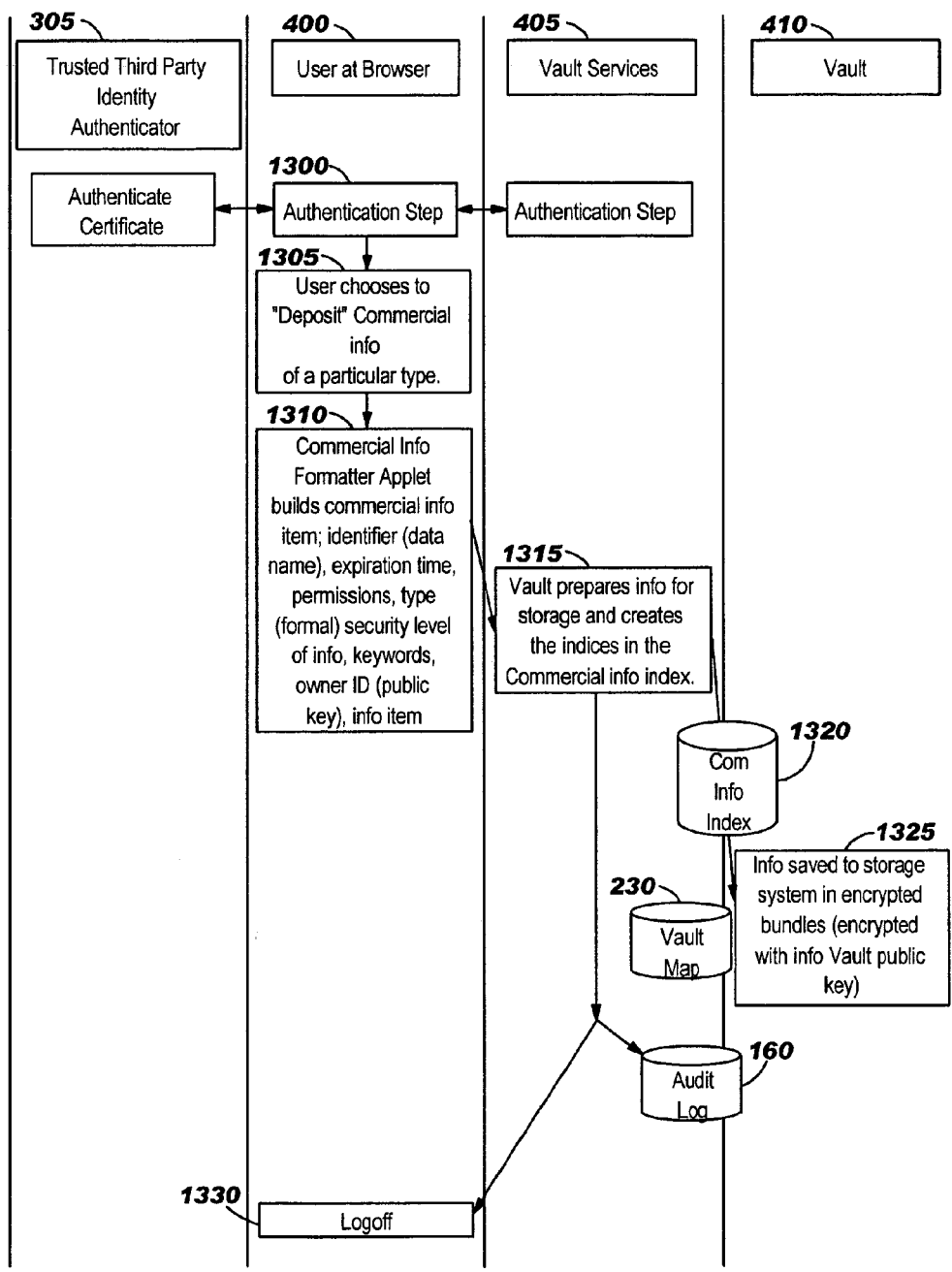
FIG. 13 is a swim lane diagram of an embodiment showing steps of commercial information deposit.

FIG. 13 is a swim lane diagram of an embodiment showing steps of commercial information deposit, beginning at step 1300 where the user 400 and vault services 405 mutually authenticate one another (e.g., via process of FIG. 4). At step 1305, the user chooses to "deposit" commercial information of a particular type into the vault. At step 1310, the user may employ a commercial data formatter applet (CDFA), typically downloaded to a user's computer, to build a commercial information item. The CDFA, when instantiated on the user's computer, guides the user to enter the appropriate information including any descriptive indexing information. The CDFA may prompt for an identifier (data name), expiration time, permissions, type (format), security level, keywords, owner ID (e.g., public key) and may confirm the information with the user and deposits the commercial information with the vault services.

At step 1315, the vault services prepare the commercial information for storage and create the indices into a commercial information index 1320 and create a handle for the information. At step 1325, the commercial information is physically stored in the vault with the vault map updated with the mapping of the information item handle to physical storage reference. The indexing information obtained during the commercial data formatting step and the information item handle may be stored in the commercial information index 1320. This set of tables may map the obtained indices to the commercial information item handle. The storing of the item in the vault, updating the vault map and the updating of the commercial information index is typically one unit of work. At step 1330, an acknowledgement of success may be passed back to the user at the browser and the user may then log off. In this way, the vault may store data on behalf of a first party that may be of interest to second party and made accessible to the second party (e.g., a business). The commercial index facilitates access to this data.

Figure 14:
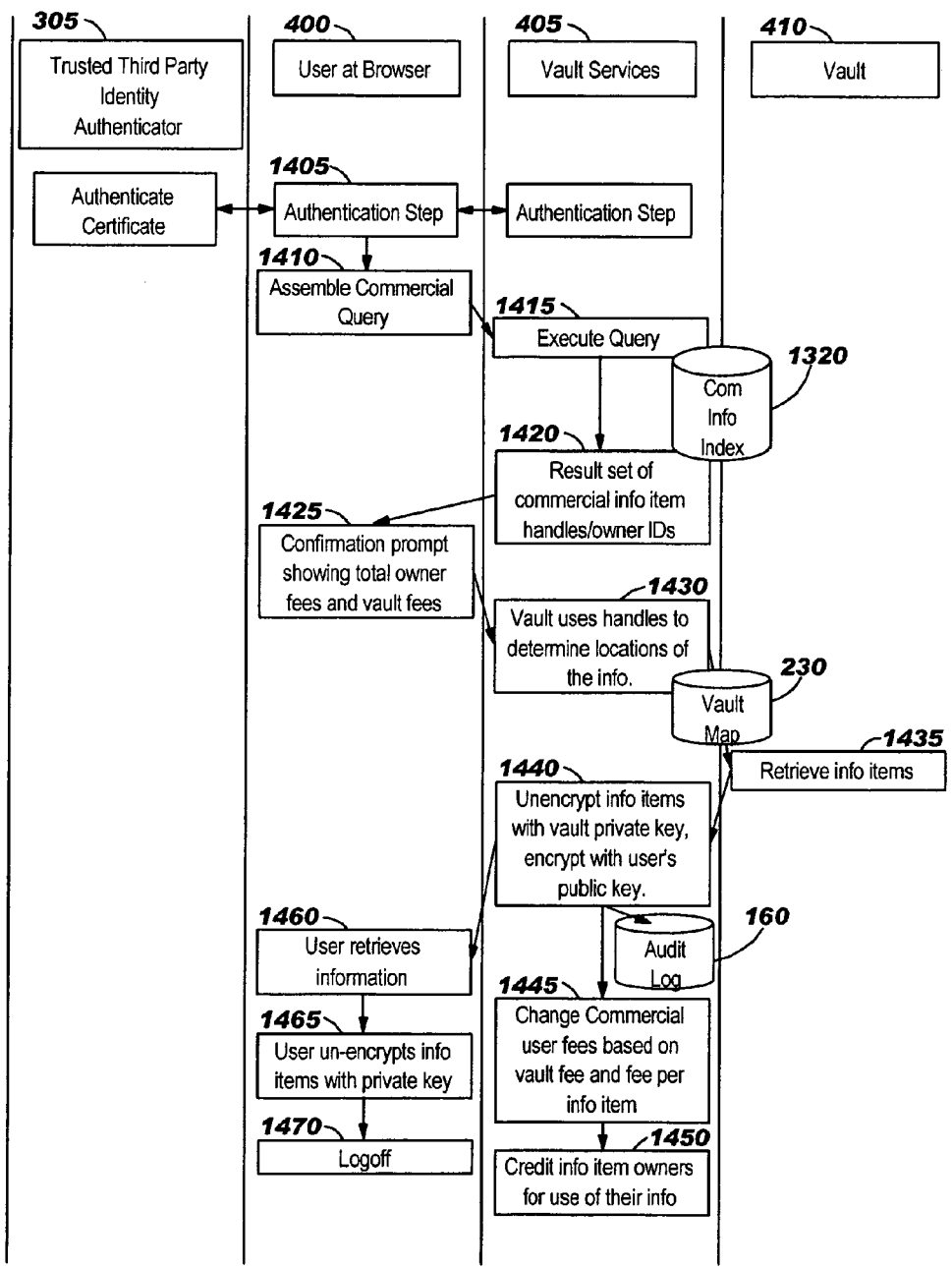
FIG. 14 is a swim lane diagram of an embodiment showing steps of commercial access to first party information.

FIG. 14 is a swim lane diagram of an embodiment showing steps of commercial access to first party information, beginning at step 1405 where the commercial second party 1400 and vault services 405 mutually authenticate one another (e.g., via process of FIG. 4). At step 1410, a commercial second party chooses to perform a query of the commercial information of a particular type. A query applet may be provided and instantiated for use by the second party commercial user. At step 1415, the query may be passed to the vault services by the query applet where the query may be executed using the commercial information index 1320.

At step 1420, the result set that meet the query criteria typically includes commercial information item handles and/or owner IDs. At step 1425, a confirmation prompt may be presented to the commercial user that may include an indication of the number of hits and actual cost to the commercial user. The fee structure may be based on fees to the vault and per item fees to the owners of the information.

At step 1430, the vault services use the handles to determine the locations of the information via the vault map 230. At step 1435, if the user chooses to proceed, the vault services retrieve the information from the vault. At step 1440, information items are decrypted using the vault's private key and re-encrypted using the commercial user's public key and returned to the commercial user. An audit log entry may be entered recording the facts of the transaction. At step 1445, any appropriate charges to the commercial user based on vault fees and/or per item fees may be made, perhaps through the vaults financial backend interface to a bank, or the like.

At step 1450, credit to the information owner may be made for use of the information. This amount may vary significantly depending on the particular information "sold" and/or fee schedules. These fees may accumulate until a threshold is met and then the account balances may be applied to the owner. At step 1460, the commercial user retrieves the information and, at step, 1465, the commercial user decrypts the information items using a private key. At step 1470, the commercial user may log off.

On-Demand Advertising

The vault system and method also provides the basis for more tightly coupling advertisers to potential consumers that rewards both for using the system and method. In addition to the vault, the system and method provides for at least one or more of:

- a database of customer survey questionnaires specific to each advertiser;
- a mechanism for advertisers to build these surveys;
- a technique for users to select advertisers of choice and populate their surveys;
- a way for advertisers to set the reward to the user for populating a survey and keeping it current; and
- an interface that facilitates the advertisers identifying and listing these interested consumers.

The vault system and method also provides the underlying mechanism that stores the consumer data, the advertiser survey skeletons, and financial data, consumer preferences, and settings for each advertiser.

Figure 15A:
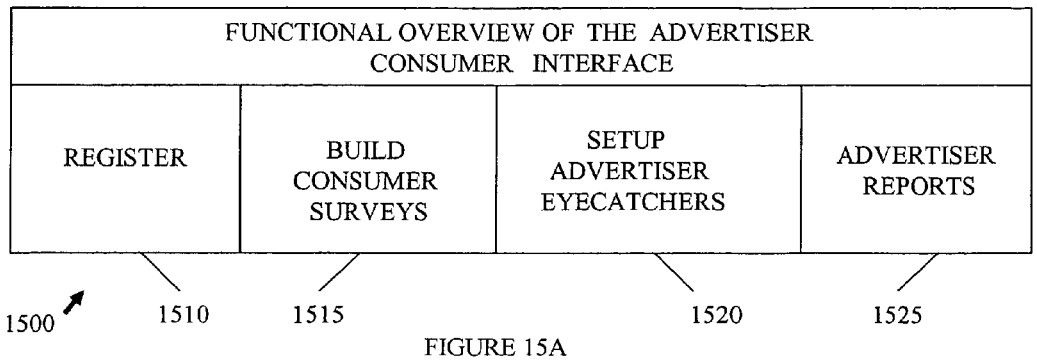
FIGS. 15A and 15B are overview functional block diagrams of advertiser/consumer interfaces.
Figure 15B:
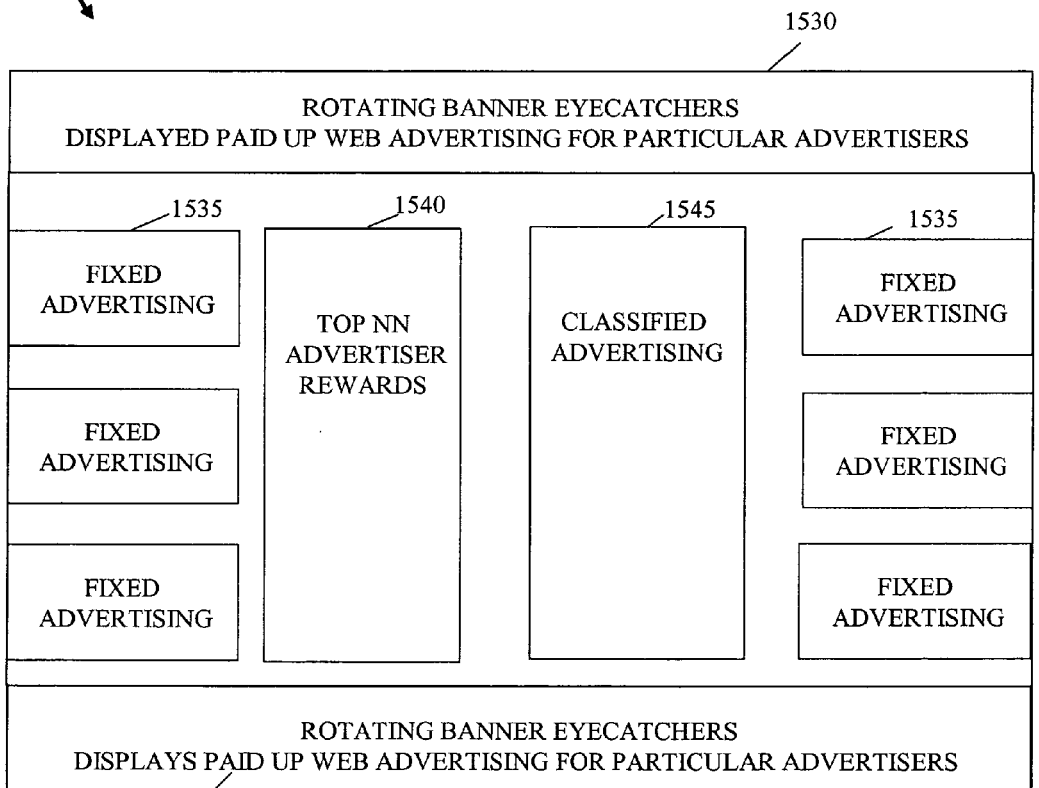

FIGS. 15A and 15B are overview functional block diagrams of advertiser/consumer interfaces, generally denoted by reference numerals 1500 and 1505, respectively. FIG. 15A shows a functional overview of an advertiser-consumer interface that includes register functionality 1510 for allowing an advertiser or consumer to register and establish an account and financial parameters. The register functionality 1510 also provides for a user to customize a home page so that advertiser's eye catchers (e.g., rotating eye catcher 1530 of FIG. 15B) are tuned to the user's preferences.

The functional overview 1500 also includes functionality to build consumer surveys, denoted by reference numeral 1525, which provides for a registered advertiser to build a questionnaire specific to a business and/or establish subscription parameters. Functional overview 1500 also includes functionality to setup or configure advertiser eye catchers, as denoted by reference numeral 1520. This functionality to configure advertiser eye catchers 1520 provides for an advertiser to purchase various types of eye catchers on one or more websites for motivating or creating incentives to fill out the advertiser's survey and, thus, to sign up for the advertiser's advertisements.

Functional overview 1500 also includes functionality to provide advertiser reports, as denoted by reference numeral 1525. The advertiser report functionality 1525 provides for a registered advertiser to access the vault and generate reports, for example, on consumers that have filled out surveys, currency flow, income, age statistics, transaction data, or virtually any type of meaningful statistic for tracking advertiser/consumer transactions and relationship.

FIG. 15B shows a functional overview of an advertiser-consumer interface 1505 that typically is associated more often with consumer presentations, but may also be provided to the advertisers as well. The overview 1505 may include functionality to present and display fixed advertising, denoted as reference numeral 1535, which displays paid up fixed advertising tuned to a user's preference. Also, the functional overview 1505 may include functionality for displaying rotating banner eye catchers 1530, 1550, which typically are rotating banners for paid up web advertising for particular advertisers.

Functional overview 1505 may also include a listing 1540 that displays the top nn (nn being a predetermined number, typically decided by the vault's overseers, operators, or equivalent) advertisers who offer the "highest" rewards to consumers for filling out a survey and signing up for that advertiser's advertising. These rankings may also take into account total benefits provided by an advertiser such as free or limited time services, for example. Also, the functional overview 1505 may also include classified advertising functionality, as denoted by reference numeral 1545. This classified advertising functionality 1545 provides for consumers to browse through paid up advertising that are arranged into categories/interests analogous to classified advertising in newspapers.

In conformance with vault operations (e.g., authentication processes), the advertisers and consumers both register and establish their accounts and financial parameters that define how debits or credits may be made to each of their accounts. Once registered, the advertiser may access an interface (e.g., a graphical user interface) that facilitates the creation of a questionnaire(s) (or surveys) that captures the information that an advertiser desires from candidate consumers. This process is described in more detail below.

Further, the advertiser may set the reward payment amount for each consumer who populates the advertiser's survey. This premium usually motivates the consumer to fill in the advertiser's survey and may become very significant as an advertiser discriminator on the consumer interlace. A similar reward may be established for keeping the questionnaire current as consumer information changes. Additionally, rewards may be set so that the consumer is rewarded when the advertiser's email advertisement (or web viewed advertising) is received and/or accessed and read by the consumer.

The consumer interface facilitates bringing the advertisers and consumers together, while maintaining degrees of privacy. In this context, the consumer may access various operations that index the advertisers by genre, catalog, banner ads, and hotspots or, more significantly, by reward. Advertiser's that offer high premiums for survey creation should be able to attract more consumers to populate their surveys. The consumer might select a particular advertiser that has caught their eye and then fills out and submits their survey. This survey is then typically stored in the Vault. The consumer's financial account may be immediately credited with the advertiser's reward and the advertiser's account is debited the reward plus a Vault fee. Throughout this process, only information that has been approved by a user (i.e., an advertiser and/or a consumer) is made available to the other, in accordance with the security operations of the vault.

The advertisers may use the report interface to find all the consumers who have filled out the surveys. This system and method provides for ordering data by currency and perform various queries of the advertiser's interested consumers based on keywords that are part of the advertiser's survey.

The advertiser may use this data for direct marketing campaigns where there is confident that the target consumer is interested in the advertiser's product. Direct mail or email from an advertiser may be sent to people, i.e., potential consumers, who have registered to receive this information. In addition, an email may be set up such that if the consumer reads the email, the user may be linked to the advertiser's web site, offer discounts and other premiums and also reward the consumer just for the act of reading the email, in this case, the vault handles (e.g., accounts and records) this financial reward transaction for reading the advertisement.

Figure 16:
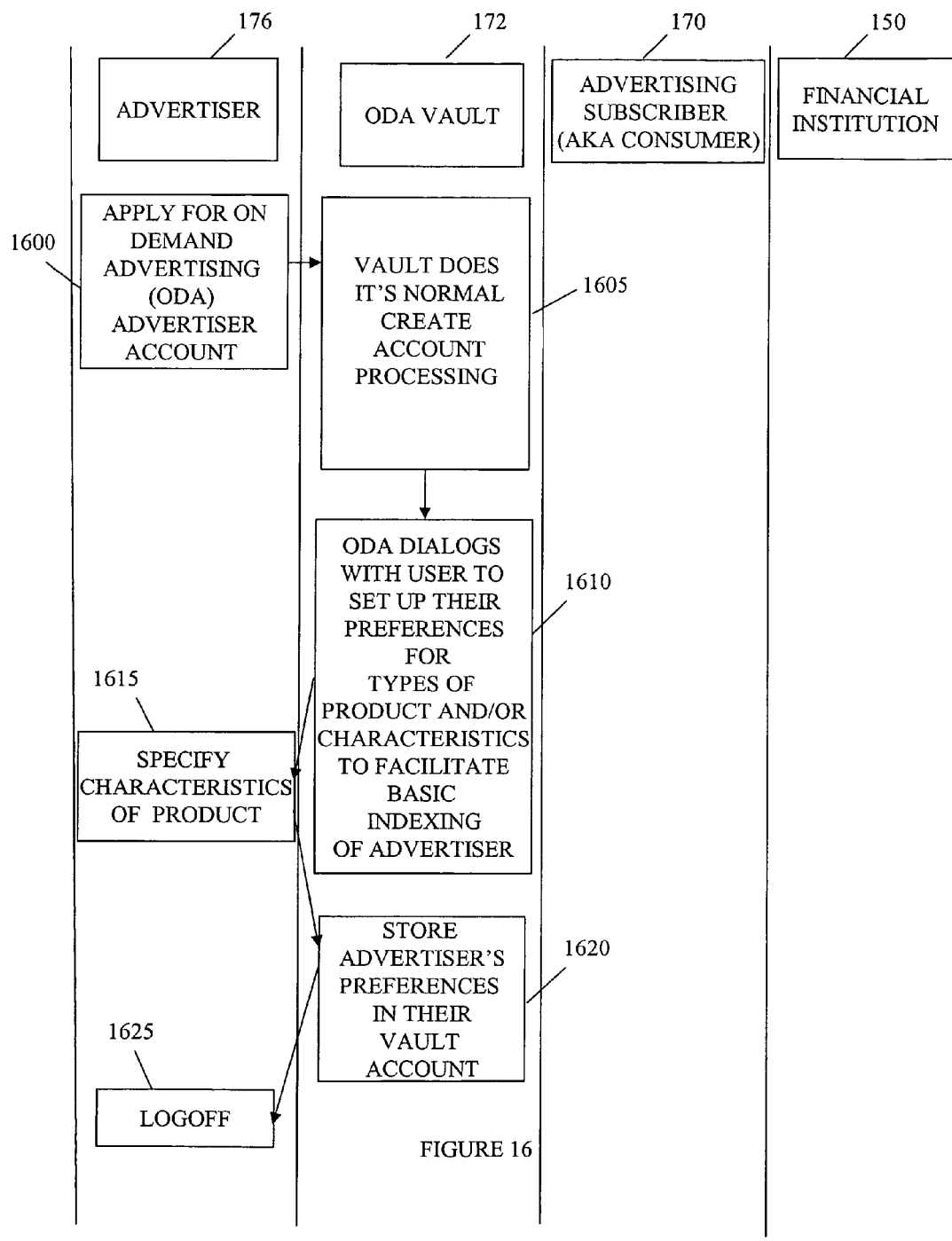
FIG. 16 is a swim lane diagram of an embodiment showing steps of registering advertisers.
Figure 21A:
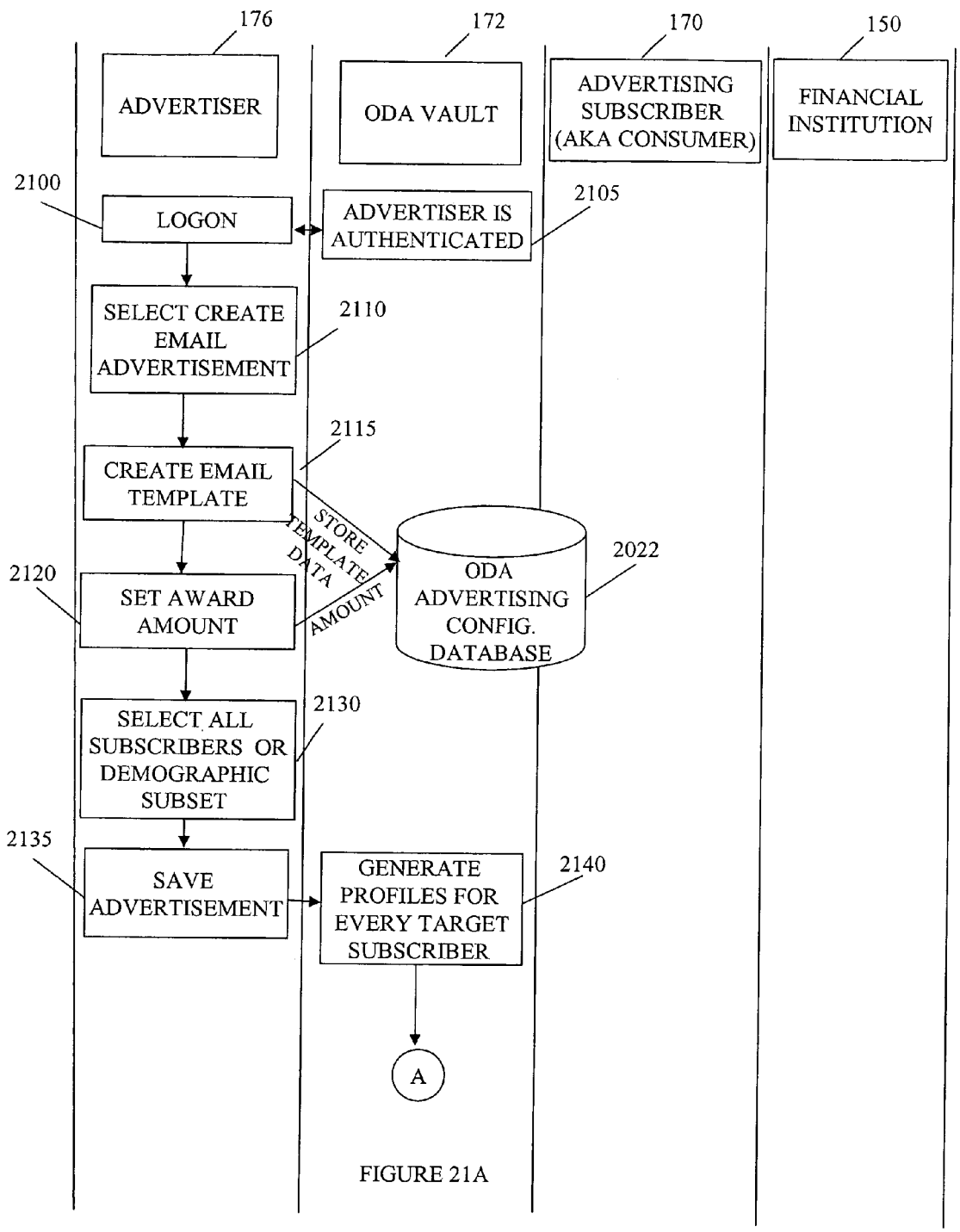
FIGS. 21A and 21B are swim lane diagrams of an embodiment showing steps of establishing bonus emails to consumers.
Figure 21B:
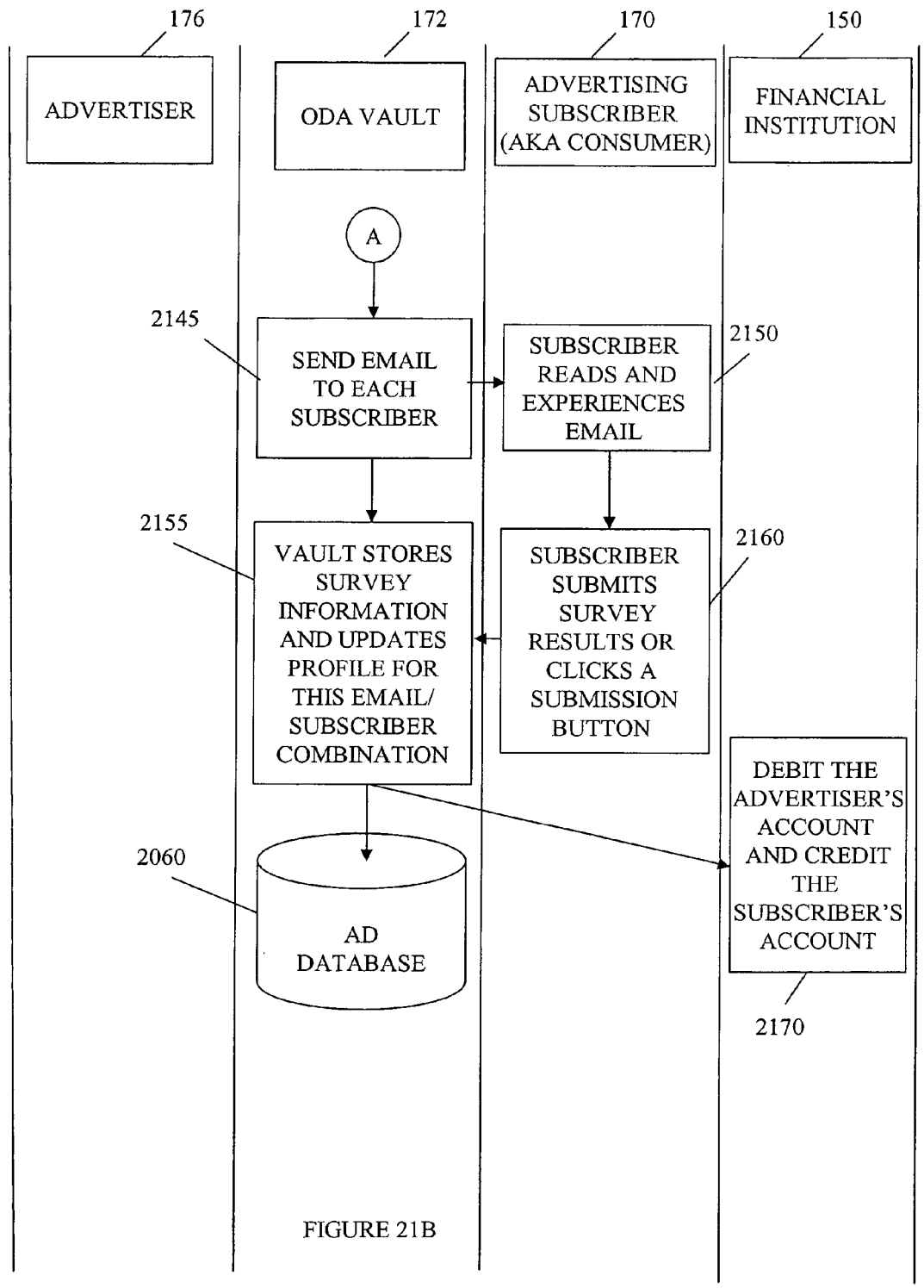

FIG. 16 is a swim lane diagram of an embodiment showing steps of registering advertisers. The swim lane diagram includes several "actors", an advertising subscriber 170 (e.g., a consumer), an FIGS. 21A and 21B are swim lane diagrams of an embodiment showing steps of establishing bonus emails to consumers equipped vault (ODA vault) 172, an advertiser 176, and a financial institution 150. The subscriber 170 and advertiser 176 are types of users, such as a first party or second party user.

At step 1600, an advertiser may apply for on demand advertising (ODA) account. At step 1605 the ODA vault creates an ODA account, verifying the request and authenticates the requesting advertiser, according to secure vault operations. At step 1610, the ODA vault dialogs with the requesting advertiser to set up preferences for types of product and/or characteristics to facilitate basic indexing of the advertiser. At step 1615, the characteristics of the product(s) may be specified by the requestor. At step 1620, the ODA vault may store the advertiser's preferences in the associated ODA vault account for the advertiser. At step 1625, the advertiser logs off.

Figure 17:
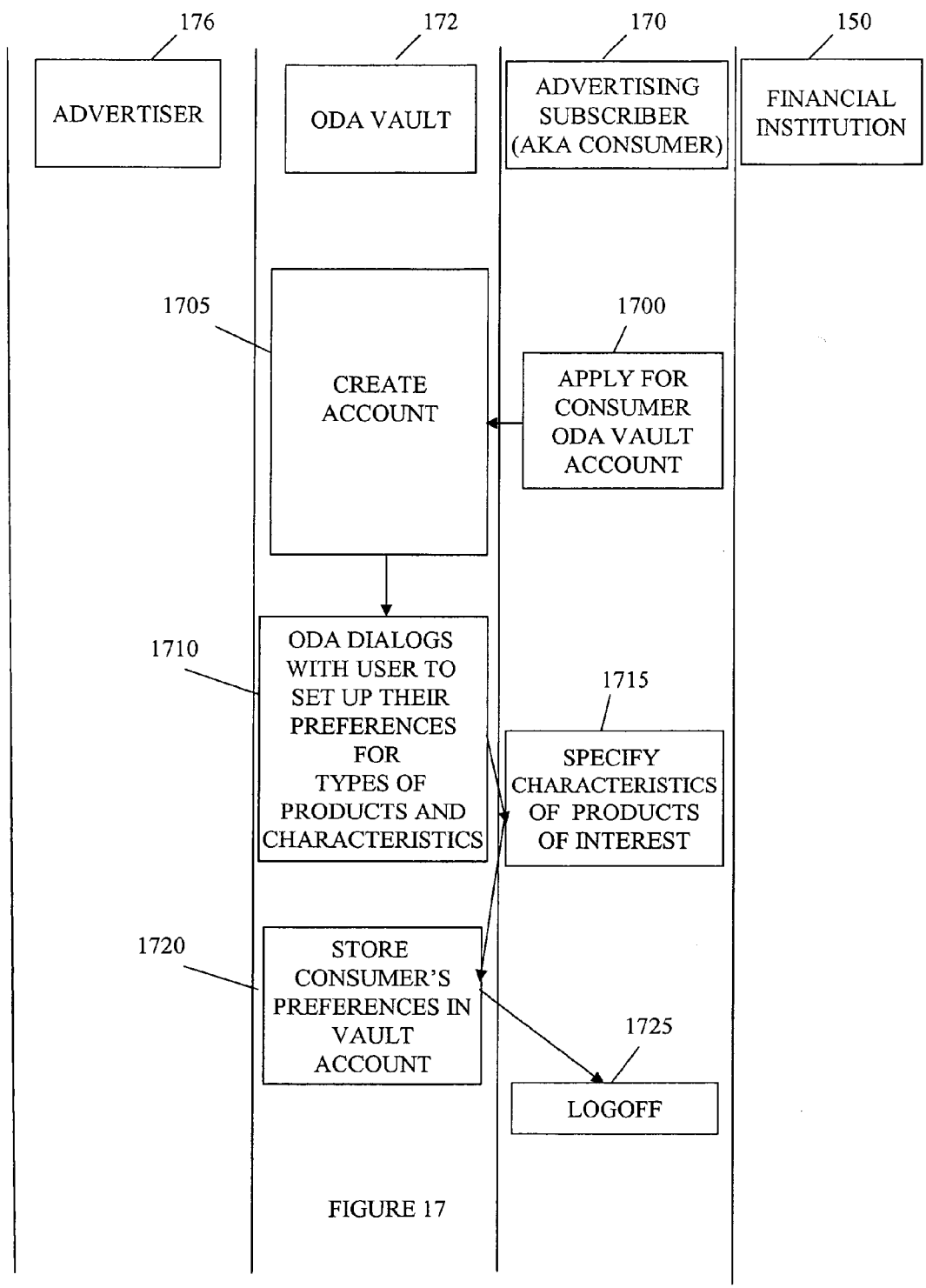
FIG. 17 is a swim lane diagram of an embodiment showing steps of registering advertising subscribers or consumers.

FIG. 17 is a swim lane diagram of an embodiment showing steps of registering advertising subscribers or consumers. At step 1700, the consumer may apply for an account with the ODA vault. At step 1705, the consumer account may be created once the consumer is authenticated according to secure vault operations. At step 1710, the ODA vault may dialog with the consumer to establish their preferences for types of products and characteristics. At step 1715, the consumer may specify the characteristics of products of interest. At step 1720, the ODA vault may store the consumer's preferences in the vault account. At step 1725, the consumer may logoff.

Figure 18A:
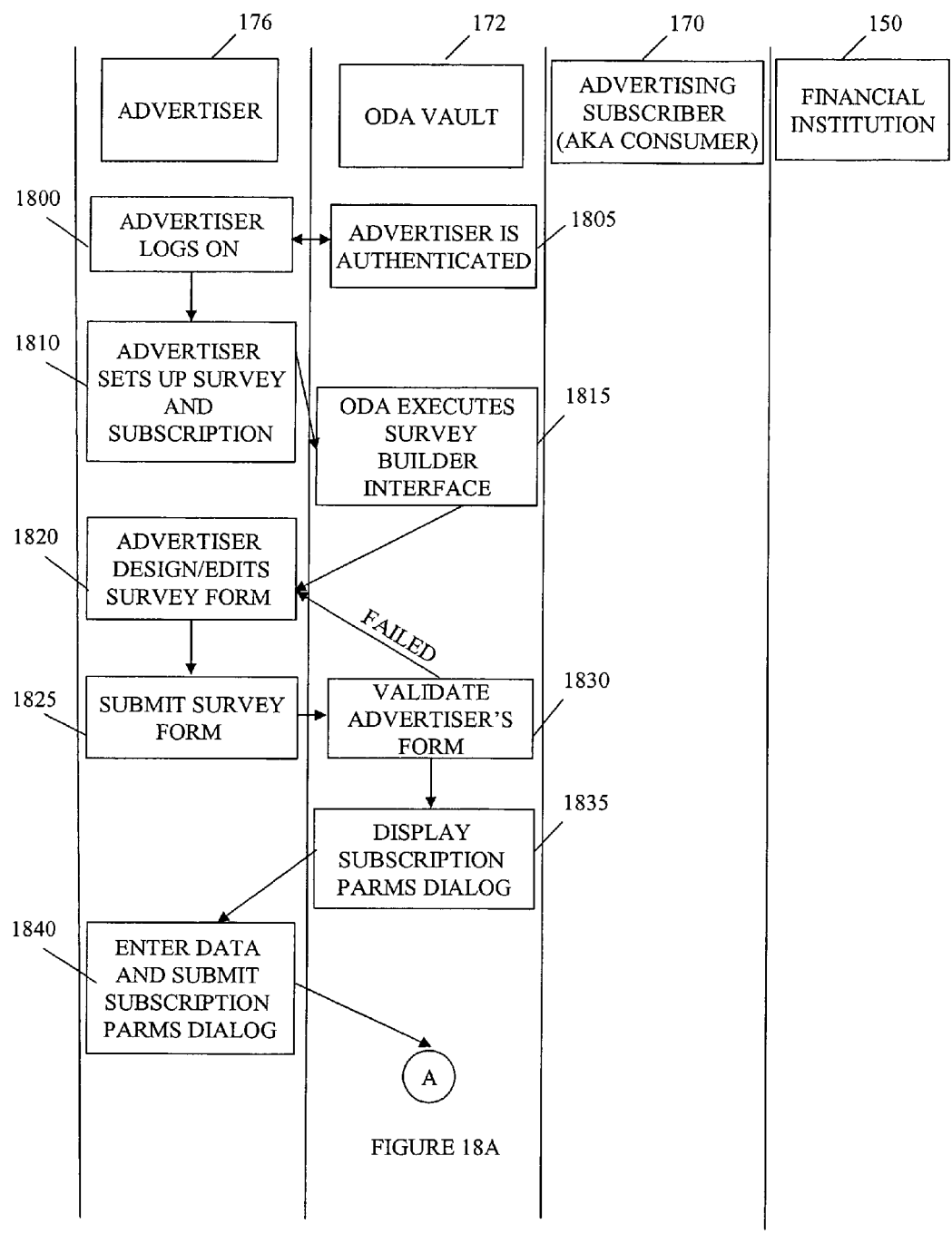
FIGS. 18A and 18B are swim lane diagrams of an embodiment showing steps of building consumer surveys.
Figure 18B:
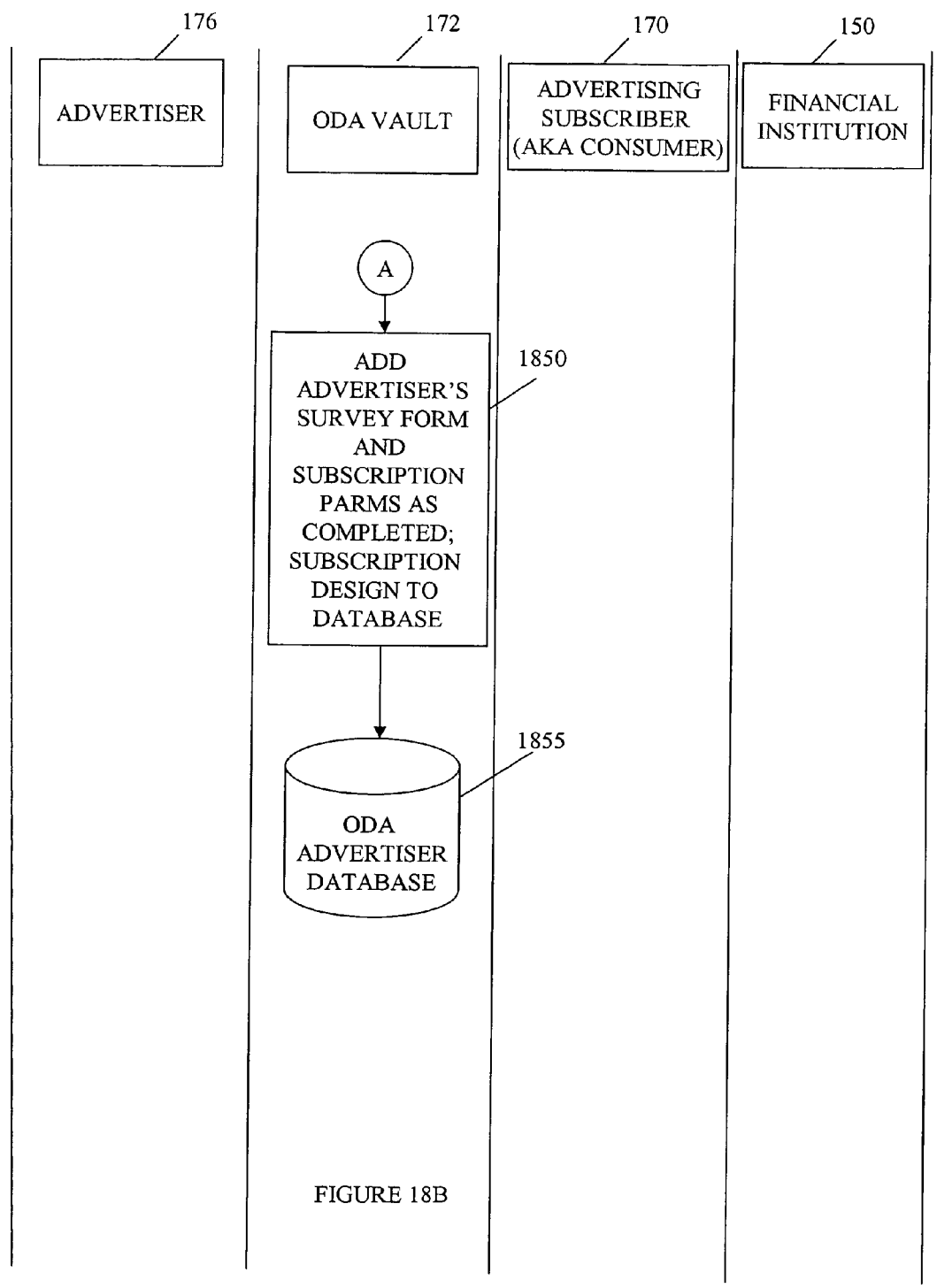

FIGS. 18A and 18B are swim lane diagrams of an embodiment showing steps of building consumer surveys. A registered advertiser logs on to the system and at step 1805 the advertiser is authenticated by the ODA vault operations. At step 1810, the advertiser may begin to establish a survey and subscription to offer consumers. At step 1815, the ODA vault may execute a survey builder interface to facilitate the building of the surveys by the advertiser. The surveys purpose is typically to poll a consumer for demographic and other specific data that the consumer might be interested in receiving. For example, a woodworking supplier might ask questions regarding what tools the consumer already owns, or what equipment may be of interest.

At step 1820, the advertiser designs and edits the survey (or questionnaire) form. At step 1825, the advertiser submits the survey form for validation. At step 1830, the ODA vault checks the form for basic information such as, for example, pre-required fields, consumer address field, name field, spelling check of questions, or the like. If the validation fails, then the process continues at step 1820.

If, however, the validation is successful, then at step 1835, the ODA vault typically displays a subscription dialog to set subscription parameters which might include a length of subscription time-period, or incentives to read the advertisements, as an example. At step 1840, the advertiser enters and submits the subscription parameters in response to the dialog.

Continuing in reference to FIG. 18B, at step 1850, the ODA vault adds the survey form and subscription parameters as completed to an ODA advertiser database 1855.

Figure 19A:
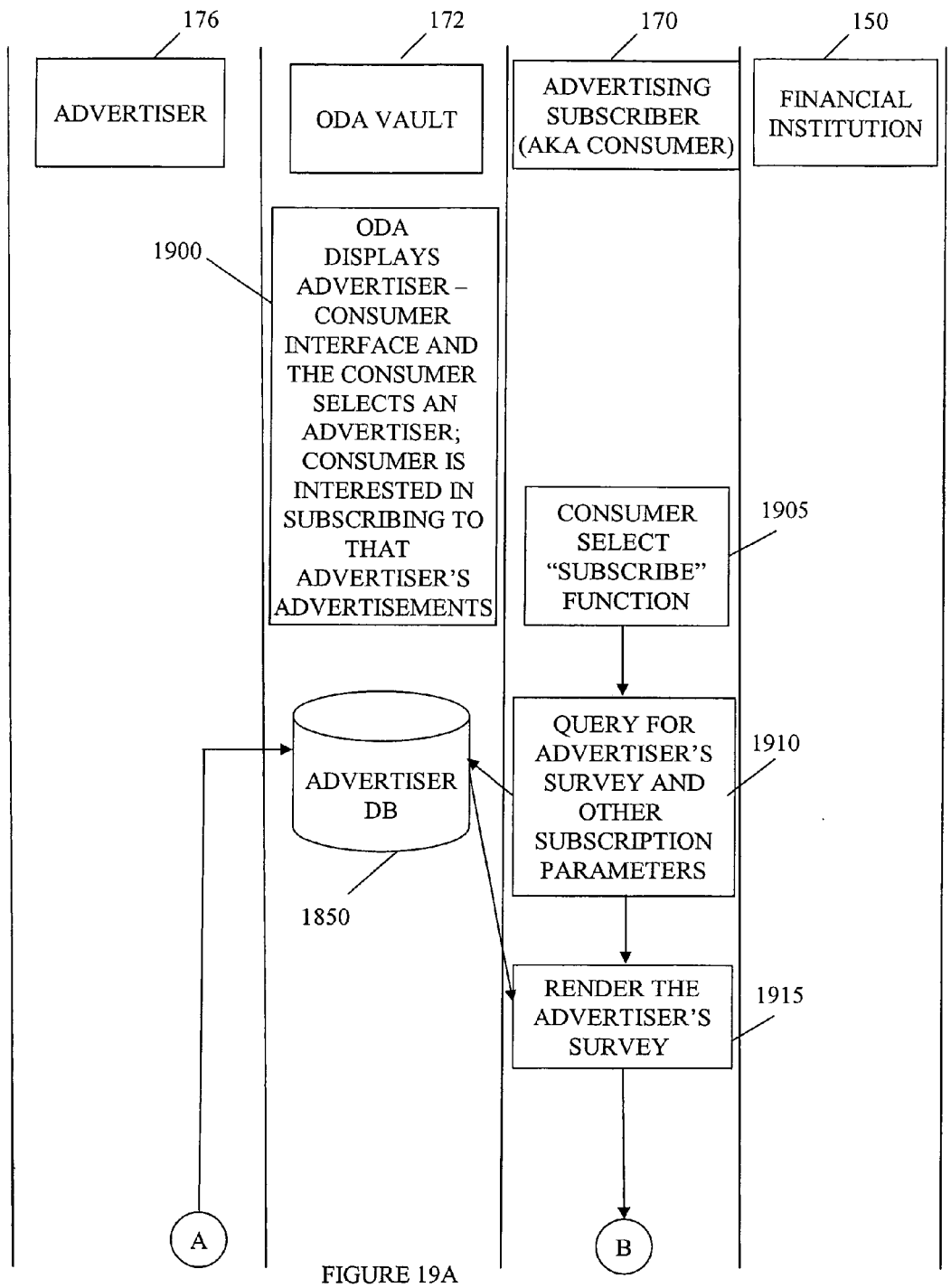
FIGS. 19A and 19B are swim lane diagrams of an embodiment showing steps of subscribing to advertisers surveys.
Figure 19B:
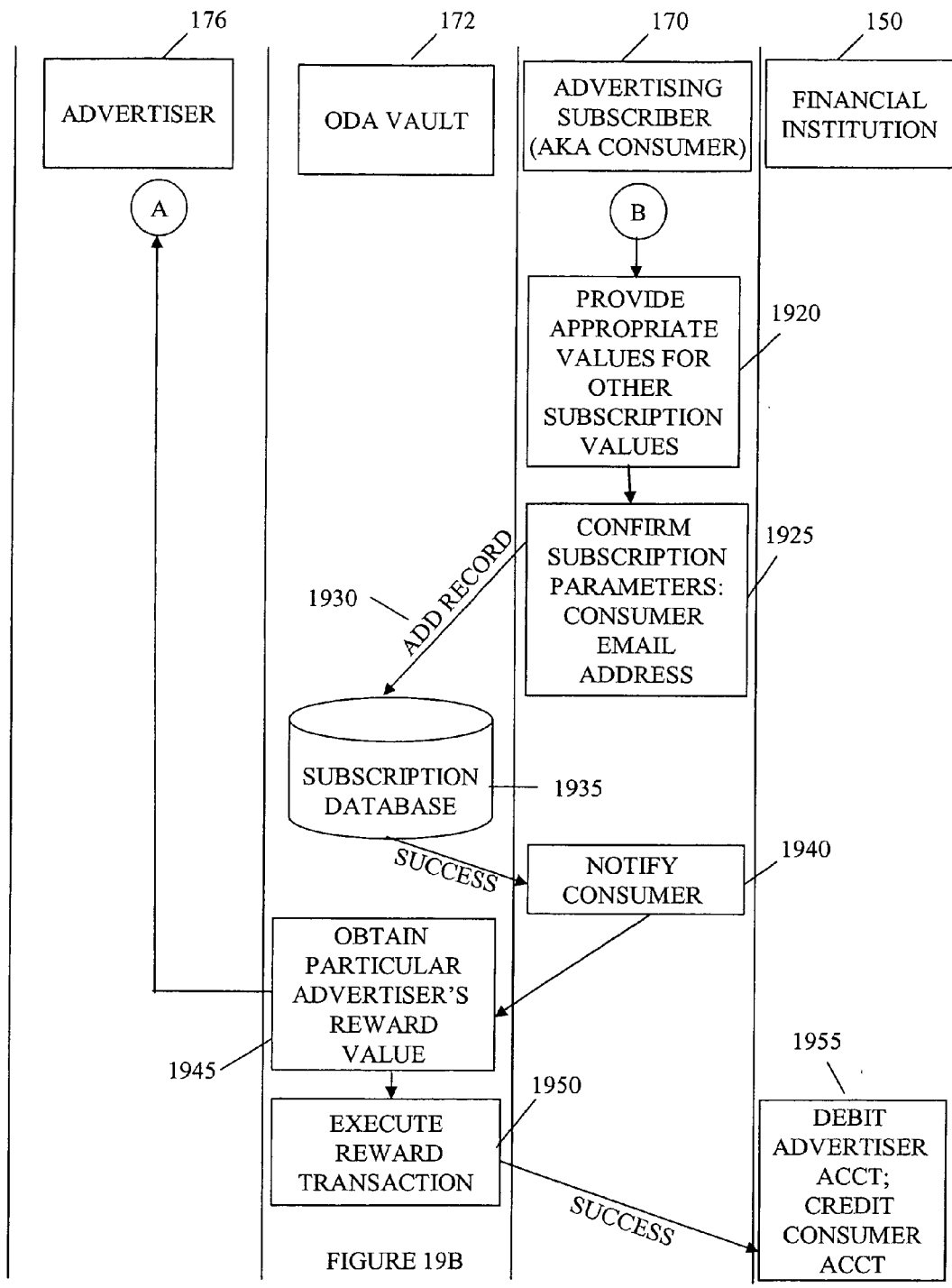

FIGS. 19A and 19B are swim lane diagrams of an embodiment showing steps of subscribing to advertisers surveys. At step 1900, the ODA vault may display an advertiser-consumer interface to a consumer according to one or more consumer preferences as established in consumer accounts. This may be initiated by a consumer visiting the ODA vault main interface. Alternatively, the consumer may respond to a on-line mailing solicitation. At step 1905, the consumer may select a subscribe function to enable subscription to one or more advertisers. The consumer may be rewarded for signing up by receiving a bonus at subscription time and/or may be rewarded by eventual reading of an advertisement. An advertiser may attract more subscribers by having more attractive awards than other advertisers. The subscribing function of the ODA vault may include a robot inhibiting readable dialog that requires entry of a viewable prompt, for example, to prevent automatic robots from establishing many subscriptions, thus avoiding improper bonus awards due to en masse subscribing attempts.

At step 1910, the consumer queries for an advertiser's subscription survey. At step 1915, the consumer receives the survey from the advertiser database 1850 and renders survey data, typically including the consumers preferred email address.

Continuing with FIG. 19B, at step 1920, the consumer provides appropriate values for subscription parameters. At step 1925, the subscription parameters may be confirmed and at step 1930 the information is recorded in the subscription database 1935. At step 1940, the consumer may be notified when the recordation of the subscription has been accomplished.

At step 1945, the consumer may obtain a reward value for the subscription activity which may be noted and recorded in the advertiser database for recording the activity of the consumer. At step 1950, the reward transaction may be executed and at step 1955, the advertiser's account may be debited according to the reward amount and credited to the consumer's account.

Figure 20A:
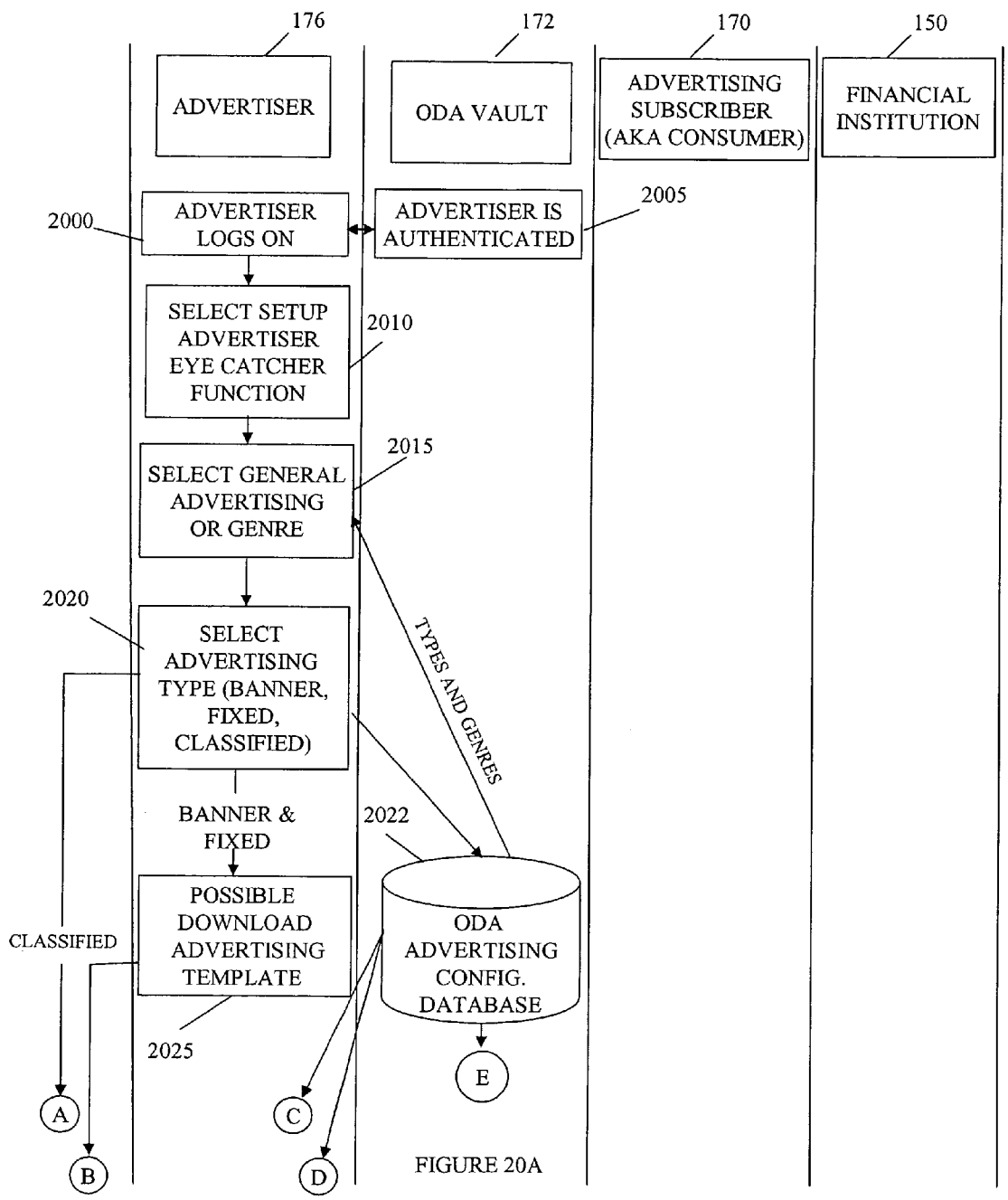
FIGS. 20A and 20B are swim lane diagrams of an embodiment showing steps of establishing eye-catchers for the advertising on the advertiser-consumer interface.
Figure 20B:
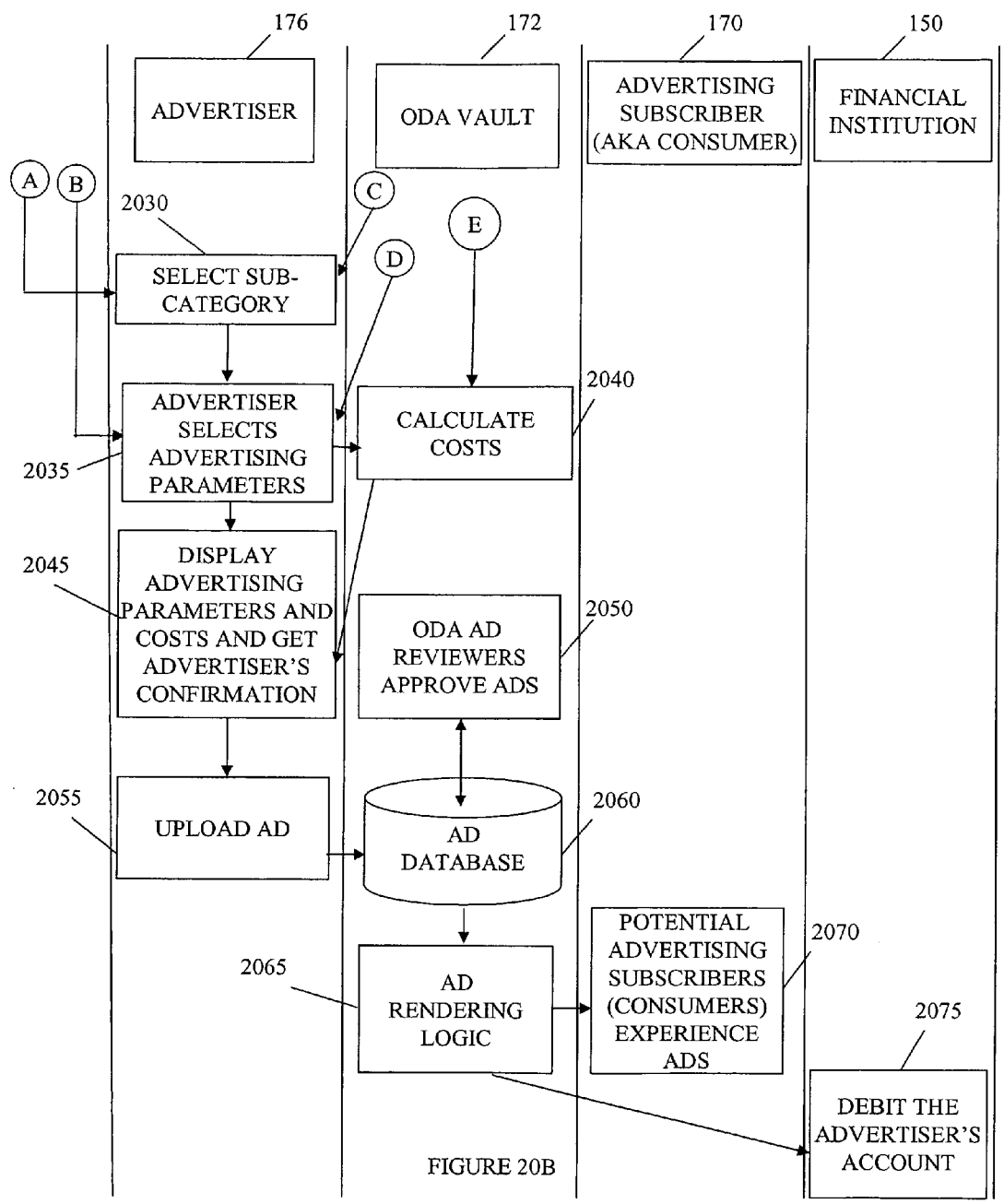

FIGS. 20A and 20B are swim lane diagrams of an embodiment showing steps of establishing eye-catchers for the advertising on the advertiser-consumer interface. Once the advertisers are registered, they may define the types of eye catchers they desire from the ODA interface. The eye catchers gain the attention of consumers in order to motivate the consumer to subscribe to the advertiser's message. Eye catchers are typically costed out and usually are paid for by the advertisers. Eye catchers may be maintained in the ODA advertising database and are typically reviewed for appropriateness by ODA approvers. The eye catchers may be rendered out depending on the type of advertising.

Continuing with FIG. 20A, at step 2000, the advertiser logs on to the ODA vault. At step 2005, the ODA vault authenticates the advertiser. At step 2010, the advertiser selects a setup advertiser eye catcher function provided by the vault services. At step 2015, the advertiser selects from among various categories of advertising such as general advertising or genre, which may be downloaded from the ODA advertising database 2022. At step 2020, the advertiser may select the type of advertising type such as banner, fixed, or classified advertising.

If the type of banner selected is banner or fixed, then at step 2025, an advertising template may be downloaded and processing proceeds at step 2035. Continuing with FIG. 20B, if however, the advertiser selects classified advertising then, at step 2030, a sub-category may be selected and template downloaded from the database 2022. At step 2035, the advertiser may select one or more advertising parameters, such as time duration, for example. The parameters may be retrieved, as necessary, from the ODA advertising configuration database. Processing continues at step 2045 if no costs are applicable to the selected add type. Otherwise, if costs apply, then at step 2040, any costs associated with the selected types of advertising may be calculated.

At step 2045, any advertising parameters and/or costs may be presented for confirmation by the advertiser. At step 2055, when the confirmation occurs, the ad may be uploaded to the ad database 2060. Once the ad has been uploaded at step 2050, ODA ad reviewers may review and approve the ads. At step 2065, the ads may be rendered out to consumers in different ways based on types of ads. For example, banner eye catchers are rendered out to consumers at the ODA web site based on the consumer's preferences and producer's products. Illustratively, a consumer interested in woodworking may possibly have a woodworking tool supplier's banner eye catcher displayed. Similarly, classifieds may be displayed as consumers search around the classified categories. Dedicated eye catchers may be displayed for all renderings of the ODA web site.

At step 2070, potential advertising subscribers, i.e., consumers, experience the ads. At step 2075, an advertiser's account may be debited based on a schedule of fees for the ads.

FIGS. 21A and 21B are swim lane diagrams of an embodiment showing steps of establishing bonus emails to consumers. At step 2100, an advertiser logs onto the ODA vault account. At step 2105, the advertiser is authenticated by the vault services. At step 2110, the advertiser may select to create a bonus email to subscribers from the ODA vault.

At step 2115, the advertiser may be presented with a template interface to build the bonus email. The email may contain attachments, hyperlinks, or simple hyper-text markup language (HTML) elements in order to create graphically rich messages and survey questions. The advertiser may also embed special character sequences to tailor the email in such a way to be more specific to individual consumers. For example, the advertiser may embed % username % to represent a subscriber's name, or % age % to represent their actual age. The special character sequence may represent any demographic information that has been captured for the subscribers. The resulting template may be stored in the ODA advertising configuration database 2022 for ongoing use for the advertiser.

At step 2120, the advertiser may set an award amount to credit a subscriber for reading the message. At step 2130, the advertiser may select all subscribers or a subset of subscribers, perhaps based on demographics such as age bracket, sex, location, organization affiliation, or the like. At step 2130, the advertiser may save the advertisement. At step 2140, the ODA vault may generate profiles to capture the survey information for every subscriber to receive the email message. Any images associated with the email may be stored in the ODA vault as well.

Continuing with FIG. 21B, at step 2145, the ODA vault sends copies of the email(s) to each targeted subscriber and changing the embedded special character sequences, if present, to the corresponding subscriber's information as appropriate to the field (e.g., %age% is converted to the subscriber's age). Processing may continue with either step 2150 or 2155, or may occur in parallel, i.e., steps 2150 and 2160 may not occur since a subscriber might not ever view the sent email, for example.

At step, 2150, a subscriber may read and experience the email and contents, and may respond to any survey. At step 2160, the subscriber submits survey results or clicks submission button to respond to the email. The subscriber may not be required to fill out a survey. The email may also contain an image or link to the ODA vault. By selecting this image or link, a browser window might open and send the consumer's public key to the vault along with any survey results, if appropriate. The ODA vault may store this information for later viewing or processing by the advertiser, according to the advertiser's purposes. Processing continues at step 2155.

At step 2155, the ODA vault accounts for each email transmission and, if email replies are received and read, captures the replies from any of the consumers and may update any profile information for any replying consumer. At step 2060, the ad database 2060 may be updated with any new profiles or consumer information. At step 2170, the advertiser's account may be debited for each instance of email viewing (or other proper response) and credit made to the consumer's account.

Figure 22:
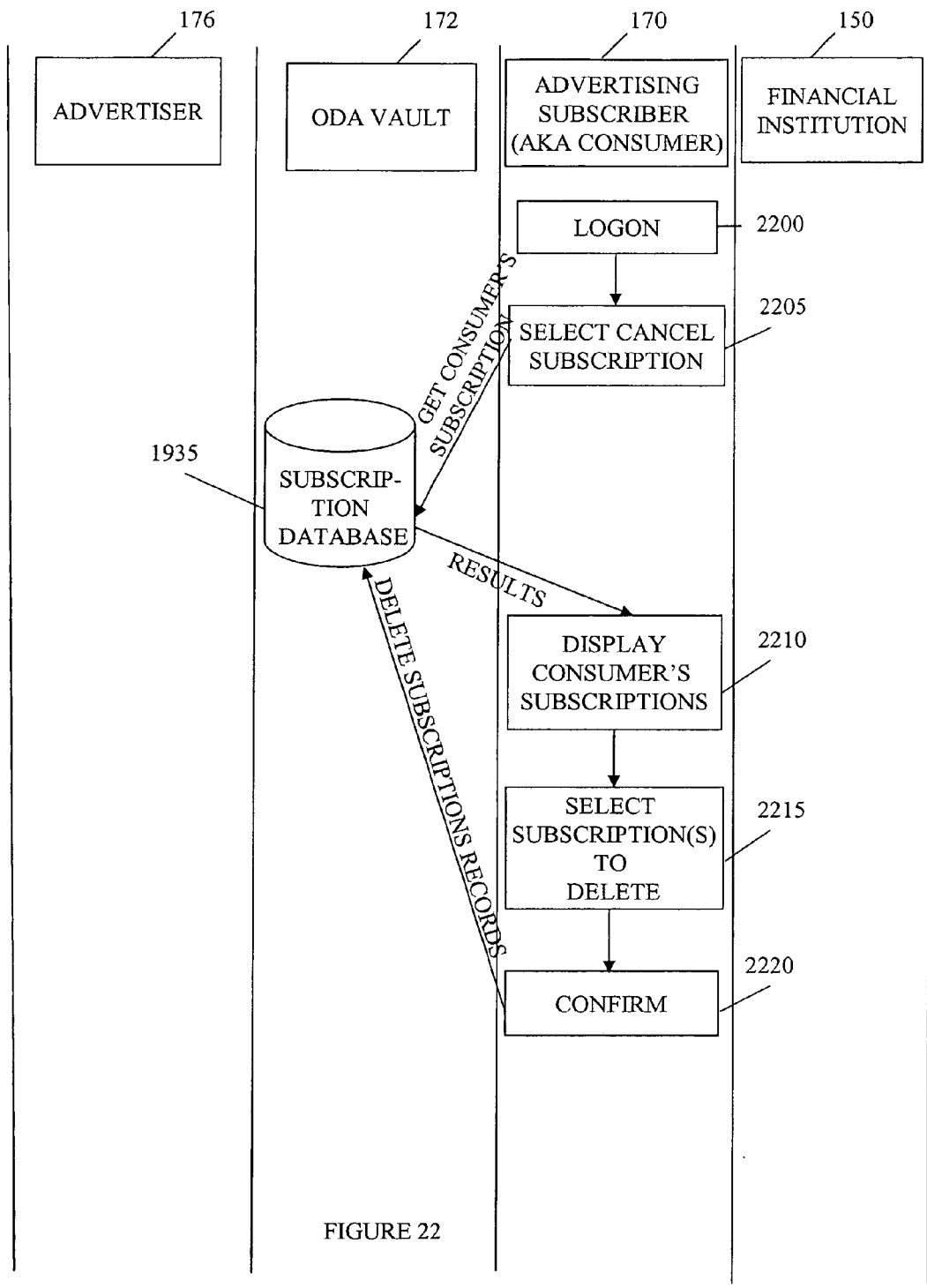
FIG. 22 is a swim lane diagram of an embodiment showing steps of canceling a consumer subscription.

FIG. 22 is a swim lane diagram of an embodiment showing steps of canceling a consumer subscription. At step 2200, the consumer may log on to the ODA vault site and may be authenticated by vault. At step 2205, the consumer selects a cancel subscription option; the subscription may be retrieved form the subscription database 1935. At step 2210, the consumer subscriptions may be displayed when retrieved from the subscription database. At step 2215, the consumer may select one or more subscriptions to one or more advertisers for deletion or deactivation. At step 2220, the consumer may be asked to confirm the deletion selection(s) and the deletions recorded in the subscription database when confirmed.

While the invention has been described in terms of embodiments, those skilled in the art will recognize that the invention can be practiced with modifications and in the spirit and scope of the appended claims.

What is claimed is:

1. A secure information repository system, comprising:
    an information vault comprising data storage securely storing information associated with an account holder;
    a deposit system securely depositing information by the account holder into the data storage, wherein the deposit system prompts the account holder to identify a security level of the information, the security level is one of private, shareable, and commercial, and the account holder identifies the security level using a string of data in a field of descriptive information about the information;
    an information access system accessing the information stored in the data storage; and
    an advertising system that each of:
        registers an advertiser with the information vault and creates an advertising account in the information vault for the advertiser;
        registers advertisements into the data storage; and
        delivers the advertisements to subscribers of the advertising system,
    wherein the information vault is a trusted third party and allows the account holder to control and manage access and dissemination of the stored information of the account holder and allows the account holder to receive compensation for the use of the stored information by the advertiser accessing the information vault, and
    wherein, only information approved by the account holder is made available to the advertiser.

2. The system of claim 1, wherein the data storage, the deposit system, the information access system, advertising system and an information withdrawal system are services of an on-demand advertising information vault and each service accessible via a network.

3. The system of claim 1, wherein the deposit system, the advertising system, the information access system; the advertising system, and an information withdrawal system use a dual key security mechanism to authenticate a transaction.

4. The system of claim 1, further comprising a charging system for charging a user for at least any one of a deposit of information into the information vault, a withdrawal of information from the information vault, information propagated by the vault and viewed, a response received triggered by accessing information propagated by the vault, subscribing to a service provided by the vault, and an access to information in the data storage.

5. The system of claim 1, wherein the data storage stores information associated with the account holder including at least any one of a credit card information, a demographic information, a medical record, a user identification information, an age, a date of birth, an address, and a financial information.

6. The system of claim 1, wherein the deposit system provides for a registered advertiser to deposit advertising information for distribution to subscribers.

7. The system of claim 1, wherein the information access system provides for a user to access a subscription service associated with the advertising system for subscribing to the advertisements.

8. The system of claim 7, wherein the user chooses a category of advertising information subscriptions to receive from the advertising system.

9. The system of claim 7, wherein the advertising system provides the advertising information subscriptions to the user based on user preferences.

10. The system of claim 1, wherein the advertisements are viewed by potential subscribers and the advertisements include at least any one of a banner advertisement information, and a classified advertisement information.

11. The system of claim 1, further comprising a tracking system for logging at least any one of a deposit to the data storage, a withdrawal from the data storage, a deletion to the data storage, an account creation, an account deletion, any propagation of information from the data storage, a subscription to the advertising system, and an access to the data storage.

12. The system of claim 1, wherein the private information is information accessible to the account holder but not to another party, sharable information is information accessible to the account holder and the other party as provided by contract, and commercial information is information accessible to the account holder and the other party if the other party is willing to pay a fee for the commercial information.

13. The system of claim 12, wherein the other party is the advertiser.

14. The system of claim 1, wherein the information identified as private information is information accessible to the account holder but not to another party, information identified as sharable information is information accessible to the account holder and the other party as provided by contract, and information identified as commercial information is information accessible to the account holder and the other party when the other party is willing to pay a fee for the commercial information.

15. A system for providing a protected information repository, comprising:
    an information vault comprising data storage for securely storing information associated with an account holder; and
    a system that:
        securely creates an advertiser account in the information vault and registers an advertiser with the information vault;
        securely deposits advertising information in the information vault;
        accesses the advertising information provided by the information vault; and
        charges or credits fees for transactional activity involving the advertising information,
    wherein the information vault is a trusted third party and allows the account holder to control and manage access and dissemination of stored information of the account holder by honoring a contract that contains information identifying the account holder and a second party and defines an agreement between the account holder and the second party and allows the account holder to receive compensation for the use of the stored information by the advertiser accessing the information vault, and wherein, only information approved by the account holder is made available to the advertiser.

16. The system of claim 15, wherein:

the system tracks transactional activity involving the information vault; and the system mutually authenticates parties using a digital certificate during a transaction with the information vault.

17. The system of claim 15, wherein:

the system expires information associated with the advertiser account in the information vault;

the system removes advertising information from the account;

the system reads advertising information from the account; and the system deletes the advertising account.

18. The system of claim 15, wherein the system prompts the account holder to identify a security level of the information, the security level is one of private, shareable, and commercial, and the account holder identifies the security level using a string of data in a field of descriptive information about the information.

19. The system of claim 18, wherein the private information is information accessible to the account holder but not to another party, sharable information is information accessible to the account holder and the other party as provided by contract, and commercial information is information accessible to the account holder and the other party if the other party is willing to pay a fee for the commercial information.

20. The system of claim 19, wherein the other party is the advertiser.

21. The system of claim 15, wherein the contract is a data structure.

22. The system of claim 21, wherein the contract is created by the account holder.

23. The system of claim 22, wherein the contract is given to the second party as a contract token.

24. The system of claim 23, wherein the information vault executes the contract as the trusted third party.

25. The system of claim 24, wherein the contract includes a first party public key and a second party public key.

26. The pct system of claim 24, wherein the contract includes contract details including: an agreed upon function, a communication security level, a time to live, and a usage limit count to control a number of times transactions occur.

27. A secure information repository system, comprising:

an information vault comprising data storage securely storing information, associated with an account holder;

a deposit system securely depositing information by the account holder into the data storage, wherein the deposit system prompts the account holder to identify a security level of the information, the security level is one of private, shareable, and commercial, and the account holder identifies the security level using a string of data in a field of descriptive information about the information, wherein:

the private information is information accessible to the account holder but not to a third party;

the sharable information is information accessible to the account holder and the third party as provided by contract; and the commercial information is information accessible to the account holder and the third party if the third party is willing to pay a fee for the commercial information;

and further comprising:

an information access system accessing the information stored in the data storage; and an advertising system that each of:

registers an advertiser with the information vault and creates an account in the information vault for the advertiser;

registers advertisements into the data storage; and delivers the advertisements to subscribers of the advertising system, wherein the information vault is a trusted third party and allows the account holder to receive compensation for the use of the stored information by the advertiser accessing the information vault.

* * * * *

UNITED STATES PATENT AND TRADEMARK OFFICE
CERTIFICATE OF CORRECTION

PATENT NO.       : 8,688,590 B2                                             Page 1 of 1
APPLICATION NO.  : 11/082489
DATED            : April 1, 2014
INVENTOR(S)      : Grim, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2081 days.

Signed and Sealed this
Thirtieth Day of May, 2017

Michelle K. Lee
*Director of the United States Patent and Trademark Office*